US011488162B2

(12) United States Patent
Tammana et al.

(10) Patent No.: US 11,488,162 B2
(45) Date of Patent: Nov. 1, 2022

(54) AUTOMATICALLY STORING METRICS RELATING TO PAYMENTS IN A BLOCKCHAIN

(71) Applicant: salesforce.com, inc., San Francisco, CA (US)

(72) Inventors: Sowmya Tammana, Hyderabad (IN); Manoj Kumar Pendyala, Hyderabad (IN); Venkata Naga Manikanta Yakkala, Hyderabad (IN)

(73) Assignee: SALESFORCE.COM, INC., San Francisco, CA (US)

( * ) Notice: Subject to any disclaimer, the term of this patent is extended or adjusted under 35 U.S.C. 154(b) by 427 days.

(21) Appl. No.: 16/802,516

(22) Filed: Feb. 26, 2020

(65) Prior Publication Data

US 2021/0264420 A1    Aug. 26, 2021

(51) Int. Cl.
*G06Q 20/40* (2012.01)
*H04L 9/06* (2006.01)
*H04L 9/00* (2022.01)

(52) U.S. Cl.
CPC ......... *G06Q 20/401* (2013.01); *H04L 9/0643* (2013.01); *G06Q 2220/00* (2013.01); *H04L 9/50* (2022.05); *H04L 2209/56* (2013.01)

(58) Field of Classification Search
CPC .............. G06Q 20/401; G06Q 2220/00; H04L 9/0643; H04L 9/50; H04L 2209/56
USPC ........................................................... 705/75
See application file for complete search history.

(56) References Cited

U.S. PATENT DOCUMENTS

| 7,730,478 | B2 | 6/2010 | Weissman |
| 10,798,100 | B1* | 10/2020 | Chu .................... G06F 16/2455 |
| 10,999,355 | B1* | 5/2021 | Chu .................... G06F 21/6272 |
| 11,360,995 | B2* | 6/2022 | Chu ......................... G06F 21/41 |
| 2017/0264640 | A1* | 9/2017 | Narayanaswamy .... H04L 63/20 |
| 2018/0040064 | A1* | 2/2018 | Grigg ...................... H04L 41/22 |
| 2020/0019932 | A1* | 1/2020 | Harris ................ G06Q 10/0838 |

OTHER PUBLICATIONS

Colendi ("Colendi Technical Paper", Sep. 5, 2018, 12 pgs, Colendi, retrieved on Jun. 15, 2022 from https://web.archive.org/web/20200919131903/https://protocol.colendi.com/whitepapers/Colendi_technical_paper_EN.pdf, metadata indicating saved on Oct. 8, 2018) (Year: 2018).*

(Continued)

*Primary Examiner* — James D Nigh
(74) *Attorney, Agent, or Firm* — Nicholson, De Vos, Webster & Elliott, LLP

(57) ABSTRACT

Implementations are described for automatically storing, in a blockchain, metrics that relate to payments. In one implementation, permissions that identify a set of metrics are retrieved from a database. The permissions are stored by a tenant of a multi-tenant system to grant permission to the multi-tenant system to store the metrics for a second tenant. A metric is selected from the set of metrics, based on a determination that a value of the metric is to be updated responsive to a payment in a transaction between the first and second tenants where the payment has been successfully processed. The value of the metric is determined for the second tenant based on data relating to the payment. The value of the metric is stored, in the blockchain, with an identifier that uniquely identifies the second tenant in the blockchain.

20 Claims, 11 Drawing Sheets

(56) References Cited

OTHER PUBLICATIONS

Colendi, "Blockchain-Based Credit Scoring Outshines "The Big Three"", Web Article, Jul. 4, 2018, 3pgs, Medium, San Francisco, California (Retrieved Dec. 11, 2019), https://medium.com/colendi/blockchain-based-credit-scoring-outshines-the-big-three-cc169701ebb0.

Colendi, "Colendi Technical Paper", Paper, Sep. 5, 2018, 12pgs, Colendi, San Francisco, California (Retrieved Dec. 11, 2019), https://protocol.colendi.com/whitepapers/Colendi_technical_paper_EN.pdf.

Colendi, Decentralized Credit Scoring and Microcredit Whitepaper, Paper, 26pgs, Colendi, San Francisco, California (Retrieved Dec. 11, 2019) https://protocol.colendi.com/whitepapers/Colendi_whitepaper_EN.pdf.

Wong, "The Basics of the Quote-to-Cash Process", Article, 2019, 12pgs, Salesforce.com, San Francisco, California (Retrieved Dec. 10, 2019), https://www.salesforce.com/products/cpq/resources/quote-to-cash-process-basics/.

"Understanding Payment Runs", Help Document, 2000-2020, 3pgs, Salesforce.com, San Francisco, California (Retrieved Dec. 19, 2019) https://help.salesforce.com/articleView?id=blng_payment_runs.htm&type=5.

\* cited by examiner

Fig. 4B

| Invoice DBO 460 | Invoice ID 363 | Entity ID 366 | Due Date 369 | Amt. 372 | Balance 475 | Desc. 478 | Inv. Date 481 | Status 483 |
|---|---|---|---|---|---|---|---|---|
| Record 442A | 1 | 2 | 1/5 | 100 | 100 | Widgets | 12/6 | Posted |
| Record 442B | 2 | 3 | 1/7 | 80 | 80 | Services | 12/8 | Pending |

| Payment DBO 445 | Payment ID 148 | Entity ID 151 | Status 154 | Amt. 157 | Invoice ID 350 | Desc. 453 | Date 455 |
|---|---|---|---|---|---|---|---|
| Record 457A | 1 | 2 | Processed | 100 | 1 | Install. | 1/5 |
| Record 457B | 2 | 3 | Draft | 200 | 2 | Late | 1/10 |

| Perms. Received DBO 433 | Entity ID 136 | Metric ID 139 | Perm. 141 |
|---|---|---|---|
| Record 142A | 2 | a | T |
| Record 142B | 3 | a,b | F |

| Perms. Granted DBO 450 | Entity ID 454 | Metric ID 456 | Perm. 458 |
|---|---|---|---|
| Record 452A | 2 | a | T |
| Record 452B | 3 | a,b | F |

Database 430

AUTOMATICALLY STORING METRICS RELATING TO PAYMENTS IN A BLOCKCHAIN

TECHNICAL FIELD

One or more implementations relate to the field of storing data in a blockchain; and more specifically, to automatically storing metrics relating to payments in a blockchain.

BACKGROUND ART

A blockchain is a continuously expanding list of records/blocks that are linked and secured using cryptography. A block is a unit of data in a blockchain. A block may include a cryptographic hash of the preceding block in the blockchain, a timestamp, and a payload (i.e., data included in a block that is not functionally related to the block or the blockchain). A blockchain may be shared and managed through a peer-to-peer network via a system of verifying/validating new blocks to be added to the chain such that a block in a blockchain cannot be altered without alteration of all subsequent blocks, which requires network consensus.

Blockchains have been used for various applications, such as distributed ledgers and credit scoring. A distributed ledger in blockchain is shared by all of the participants in that blockchain. Distributed Ledger Technology (DLT) helps to address and overcome many of the types of shortcomings of conventional financial systems. Credit scoring may be facilitated by storing data relating to potential borrowers in a blockchain. Merchants, financial institutions, telecoms, and other entities may process data relevant to a credit score, such as data relating to payments to be made by an entity.

A tenant in a multi-tenant system (e.g., customer relationship management (CRM) system) may use the system to process payments to be made to the tenant by other entities, including other tenants of the multi-tenant system. A multi-tenant system is a system in which various elements of software and/or hardware may be shared by one or more tenants.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 4B is a diagram that shows a data model for storing data relating to payments and permissions for storing metrics in a blockchain, according to some implementations.

DETAILED DESCRIPTION

The following description describes implementations for automatically storing, in a blockchain, metrics relating to payments.

Automatically Storing Metrics Relating to Payments

Figure 1A:
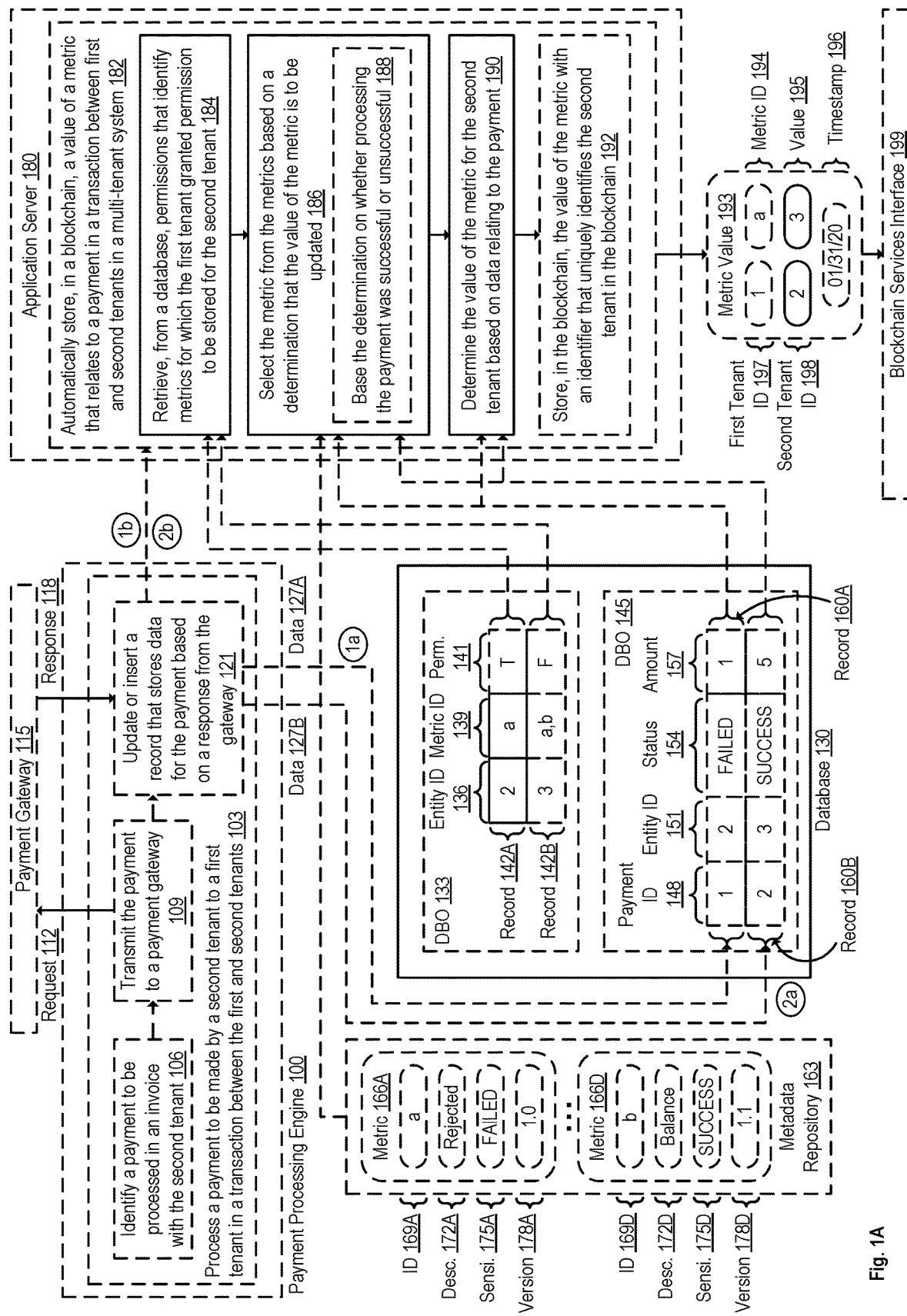
FIG. 1A is a block diagram that shows systems for automatically storing metrics relating to payments in a blockchain, based on a response from a payment gateway, according to some implementations.

FIG. 1A is a block diagram that shows systems for automatically storing metrics relating to payments in a blockchain, based on a response from a payment gateway, according to some implementations. FIG. 1A shows a payment processing engine 100, a payment gateway 115, a database 130, a metadata repository 163, an application server 180, and a blockchain services interface 199 to a blockchain (e.g., blockchain 599 shown in FIG. 5B).

Processing a Payment

In block 103, the payment processing engine 100 processes a payment to be made by a second tenant to a first tenant in a transaction between the first and second tenants. A payment is an exchange of value (e.g., money) between two entities in a transaction (i.e., an interaction between two entities that involves an exchange involving at least one payment). A tenant is an entity which shares a multi-tenant system. For example, a tenant may share a multi-tenant CRM system and use that system to record and process payments. Although implementations are described herein that involve a first tenant causing processing of a payment from a second tenant to the first tenant, such implementations are illustrative and not limiting. Other implementations may include a first tenant causing the processing of payment from the first tenant to a second tenant, from the first tenant to another entity (which may or may not be a tenant), from an entity (which may or may not be a tenant) to the first tenant, etc.

The payment processing engine 100 may process a payment responsive to different triggers. For example, payment processing engine 100 may process a payment responsive to a job for processing payments (also referred to as a payment run). A job is a computing task that is scheduled to be executed on an electronic device at a given time (e.g., immediately, at a future time, etc.); e.g., a job created with the utility named "CRON" on Unix-like operating systems; a task created with Windows Task Scheduler on the Windows operating system; a task created with a grid broker; etc. Execution of a job is execution, by an electronic device, of instructions that comprise the job. For another example, payment processing engine 100 may process a payment on an ad-hoc basis (e.g., responsive to a request from an entity involved in a transaction), which may be part of a job or otherwise.

In some implementations, block 103 includes block 106. In block 106, a payment to be processed is identified in an invoice with a second tenant. For example, block 106 may be included in implementations where payment processing engine 100 processes a payment responsive to a scheduled job, and the job retrieves one or more invoices for identifying payments to be processed in those invoices. Block 106 may be included in an implementation which supports ad-hoc payment processing, however. In one implementation, processing a payment on an ad-hoc basis may include identifying whether an invoice is associated with the payment to be processed. From block 106, flow passes to block 109.

In block 109, the payment is transmitted to payment gateway 115. Specifically, a request 112 may be submitted to payment gateway 115 for processing of the payment. Processing a payment means one or more operations, undertaken on an electronic device, with the intent that a payment is effectuated thereby. For example, payment gateway 115 may allow for effectuating credit card transactions or bank transfers. Accordingly, request 112 may include data relating to the form of payment, together with data relating to the payment. Data relating to a payment includes data that describes the payment (e.g., an amount, a currency, a date that the payment was or is to be processed, a status, an outcome of processing the payment if processed, etc.). However, data relating to a payment may include data that describes past payments (involving the payee and/or payor), and/or the transaction or exchange involving the payment (e.g., an outstanding balance, a due date for the payment, other payment terms, etc.). In one implementation, request 112 is submitted to an endpoint of an Application Programming Interface (API) that payment gateway 115 provides.

In block 121, data 127 is stored in database 130 responsive to receiving response 118 from payment gateway 115. Specifically, block 121 includes updating or inserting a record 160 that stores data for the payment based on a response 118 from the payment gateway 115. Record 160 is stored in database 130. Database 130 includes database object (DBO) 145, which includes various fields for a record 160: payment ID 148 (to store a value that identifies a payment); entity ID 151 (to store a value that identifies an entity (e.g., a tenant) for which is the payor); status 154 (to store a value that describes the status of the payment); and amount 157 (to store a value corresponding to the amount, in a unit of currency, for the payment). A record is a set of fields stored in a database object; a field is part of a record and stores one or more values (also referred to as data); and a DBO is an object managed by a database management system (DBMS; also referred to as a database system) (e.g., a relational database table in a relational database management system (RDBMS)). In one implementation, flow passes from block 109 to block 121, which is then performed responsive to payment gateway 115 returning the response 118 (i.e., block 121 is performed synchronously). In another implementation, block 121 is performed responsive to payment gateway 115 returning the response 118 (i.e., block 121 is performed asynchronously).

As FIG. 1A shows, at time 1*a* (indicated by circled reference "1*a*") in block 121, record 160A is updated or inserted with data 127A. Record 160A includes a value of: 1) "1" for payment ID 148; 2) "2" for entity ID 151; 3) "FAILED" for status 154; and 4) "1" for amount 157. Thus, record 160A stores data relating to a payment which has an ID with the value of "1," for an amount of "1," from an entity which has an ID with the value of "2," where processing the payment failed. These values and the schema (e.g., the set of DBOs and the fields therein) of database 130 are illustrative and not limiting. For example, another schema for a database is discussed later herein referring to FIG. 4B.

In contrast, at time 2*a* (indicated by circled reference "2*a*") in block 121, record 160B is updated or inserted with data 127B. Record 160B includes a value of: 1) "2" for payment ID 148; 2) "3" for entity ID 151; 3) "SUCCESS" for status 154; and 4) "5" for amount 157. Thus, record 160B stores data relating to a payment which has an ID with the value of "2," for an amount of "5," from an entity which has an ID with the value of "3," where processing the payment was successful. An identifier (ID) is information to identify one or more objects; e.g., an entity, a record in a DBO, etc.

At time 1*b* (indicated with circled reference "1*b*"), block 182 is performed. Block 182 includes automatically storing, in a blockchain, a value of a metric that relates to a payment to be made in a transaction between first and second tenants. A metric is a standard of measurement; e.g., metrics relating to payments may represent current balance owed, number of payments that are currently overdue, number of rejected payments, etc. In one implementation, block 182 is performed by application server 180.

Use of a blockchain for storing a value of a metric provides for better system integration, trusted audit trails through the immutability of the stored values, and thus improved ease of use and transparency of the data for tenants and third parties using it. However, storing metric values automatically (i.e., without further user input) provides additional benefits. Notably, values of metrics can be stored promptly after a payment is made, a payment is missed (i.e., a payment is not made by a date that the payment is due to be made), processing a payment is attempted but the processing is unsuccessful, etc. Thus, automatically storing values of metrics relating to payments results in stored values that are more up to date than otherwise. Moreover, the values have better guarantees of reliability. Since the values are based on a tenant's operational data (i.e., data relating to the payment), the likelihood that the values are inaccurate may be reduced. Automatically storing the values is also more likely to result in metric values being stored, compared with approaches where a tenant manually stores such values. In a multi-tenant system where the host environment automatically stores metrics values for a tenant, the tenant need not perform manual steps to store the values in a blockchain after appropriate permissions are set (as discussed later herein). The host environment can also manage the storing of metrics for more predictable use of the underlying infrastructure, amongst other advantages.

Permissions for Storing Metrics

In block 184, permissions are retrieved from a database 130 that identify metrics 166 for which the first tenant granted permission to be stored for the second tenant. In one implementation, the permissions are stored by a first tenant of a multi-tenant system to grant permission to the multi-tenant system to store the first set of metrics for a second tenant of the multi-tenant system. Database 130 includes DBO 133. DBO 133 includes fields that include entity ID 136, metric ID 139, and permission 141 (shown as "Perm." in FIG. 1A, for brevity). Thus, record 142 in DBO 133 stores values that identify an entity (entity ID 136) that granted or denied permission (permission 141) for the identified metrics (metric ID 139). Other implementations may capture this information differently (e.g., by only storing permissions that have been granted (rather than denied); by storing the information by metric and entity that granted permission for the metric; etc.) and/or capture different information (e.g., a time at which permission was granted (or denied); a description for how the permission was granted (or denied); etc.).

At time 1b, data relating to the payment includes data stored in record 160A. Entity ID 154 has a value of "2" for record 160A, indicating that the payment was between the tenant and another tenant which has an ID of "2." Record 142A in DBO 133 has a value of "2" for entity ID 139. Thus, in one implementation at time 1b, block 184 includes retrieving record 142A. Record 142A also includes a value of "a" for metric IDs 139, and a value of "T" for permissions 141 (indicating that the tenant which has an ID with the value of "2" granted permission for metric 166A to be stored).

At time 2b, data relating to the payment includes data stored in record 160B. Entity ID 154 has a value of "3" for record 160B, indicating that the payment was between the tenant and a tenant which has an ID with a value of "3." Record 142B in DBO 133 has a value of "3" for entity ID 139. Thus, in one implementation at time 2b, block 184 includes retrieving record 142B. Record 142B also includes a value of "a, b" for metric IDs 139, and a value of "F" for permissions 141 (indicating that the tenant which has an ID with the value of "3" denied permission for metric 166A and metric 166D to be stored).

Metadata repository 163 includes metrics 166A-D. Metadata is data that describes other data; metric 166 represents a metric relating to payments. In the implementation shown, metric 166 includes ID 169, description 172 (indicated with the text "Desc." in FIG. 1A, for brevity), sensitivity 175 (indicated with the text "Sensi."), and version 178. ID 169 identifies a metric 166 as against other metrics. Description 172 includes a value describing the metric 166. Sensitivity 175 indicates one or more conditions to be satisfied for the metric 166 to be updated (e.g., that processing a payment was successful; that processing a payment was unsuccessful; that a payment was not made; etc.). Version 178 indicates a version of the system in which the metric 166 was introduced. Implementations may support one or more of ID 169, description 172, sensitivity 175, version 178, and/or other attributes.

Metric 166A includes a value of "a" for ID 169A; i.e., the ID referenced in metric ID 139 of record 142A. Metric 166A also includes a value of "Rejected" for description 172A (e.g., indicating that the metric represents a number of rejected payments), a value of "FAILED" for sensitivity 175A (e.g., indicating that metric 166A is to be updated when processing a payment is unsuccessful (e.g., when record 160 has a value of "FAILED" in status 154), and a value of "1.0" for version 178A. From block 184, flow passes to block 186.

Selection of Metric to Be Updated

In block 186, a metric 166 is selected based on a determination that the value 195 of the metric 166 is to be updated. Different implementations may use different ways to make the determination.

In one implementation, a determination may be made that all metrics 166 for which permission was granted are to be updated. For example, in such an implementation, a metric 166 is to be updated regardless whether a value 195 of the metric 166 has changed relative to the last value of the metric 166 that was stored in the blockchain. A value 195 of a metric 166 might not change when one or more conditions for the metric 166 to be updated have not been satisfied. For example, a value of a metric that represents a number of rejected payments (such as metric 166A) will not change responsive to processing a payment successfully. Regardless, a determination that all metrics 166 for which permission was granted are to be updated may be useful. Automatically storing a value 195 of a metric 166 that has not changed, nonetheless indicates an up to date value 195 of the metric 166.

In another implementation, block 186 includes block 188. In block 188, the determination that the value 195 of the metric 166 is to be updated is based on whether processing the payment was successful or unsuccessful. This may be indicated in response 118 from payment gateway 115 that processed the payment. Additionally, or alternatively, whether the payment was processed successfully or unsuccessfully may be stored in record 160 in database 130.

Some implementations further base the determination on whether an attribute of metric 166 indicates whether metric 166 is to be updated; e.g., on a value of sensitivity 175. Selecting a metric 166 to be updated, based on a determination that the value 195 of the metric 166 is to be updated, provides several advantages. For example, selecting only those metrics 166 that are to be updated avoids unnecessary data processing incurred in updating metrics 166 whose values have not changed. Moreover, storing data in the blockchain incurs overhead. Storing data in a blockchain includes adding a block to the blockchain, which may involve encrypting the block, communicating amongst nodes in the peer-to-peer network, obtaining consensus amongst nodes to add the block to the blockchain, etc. Storing data in the blockchain thus incurs overhead in terms of the time needed to add a block, as well as in processor cycles, network communications, use of storage media, etc. Selecting only those metrics 166 that are to be updated avoids incurring this overhead.

Returning to the example of metric 166A at time 1b, processing the payment was unsuccessful, as the value of "FAILED" in status 154 of record 160A indicates. In one implementation, whether processing the payment was successful or unsuccessful 1) is transmitted to (or retrieved by) application server 180 by (or from) payment processing engine 100; and 2) need not be indicated in a record 160 of database 130.

In one implementation, the determination that the value 195 of metric 166A is to be updated is further based on an attribute of metric 166A; e.g., on sensitivity 175A. Sensitivity 175 has a value of "FAILED." Thus, based on sensitivity 175A, the value of metric 166A is to be updated (e.g., based on the processing the payment being unsuccessful). Other implementations may use other ways to determine whether the value 195 of the metric 166 is to be updated. For example, one implementation may determine whether a data structure (e.g., a map) includes a set of conditions to be satisfied for a given metric 166 to be updated, and determine whether any such conditions are satisfied. Another implementation may determine that a database object on which metric 166 depends has been changed (e.g., a value 195 of a metric 166 that measures outstanding balance may change when a record representing an invoice is inserted in a database object). From block 186, flow passes to block 190.

Determining a Value of the Metric

In block 190, the value 195 of the metric 166 is determined for the second tenant, based on data relating to the payment. Determining a value 195 for the metric 166 includes determining a value 195 for the measure that metric 166 represents. In turn, determining the value for the metric 166 may be based on a last (also referred to as a latest) value of the metric 166 that is stored in the blockchain, and/or on one or more values that are stored in database 130 (and/or other database(s)).

As previously described, metric 166A represents, for an entity, a number of rejected payments. Thus, a value 195 of metric 166A is based on data relating to the payment; i.e., on whether the payment was unsuccessful. Also, a value 195 for metric 166A is further based on a last value of metric 166A that is stored, in the blockchain, for the entity.

In contrast, metric 166D represents a current balance owed by an entity. Metric 166D includes a value of "b" for ID 169D. Metric 166D also includes a value of "Balance" for description 172D (e.g., indicating that the metric represents a current balance owed), a value of "SUCCESS" for sensitivity 175D (e.g., indicating that metric 166D is to be updated when processing a payment is successful (e.g., record 160 stores a value of "SUCCESS" in status 154))), and a value of "1.1" for version 178D. Thus, a value 195 of metric 166D is based on data relating to a payment (i.e., on whether the payment was successful), and further based on a last value of metric 166D that is stored, in the blockchain, for the entity (e.g., a value of a current balance that the entity owes).

By way of another example, a metric 166 might represent a number of currently overdue payments for an entity. Currently overdue payments are payments which are unpaid and are currently overdue. A value 195 of such a metric 166 is based on data relating to a payment; i.e., whether processing a payment is successful and the payment is overdue (which reduces the number of currently overdue payments) or whether a payment is not made and the payment is overdue (which increases the number of currently overdue payments). Is should be noted that the value 195 of a metric might be based on data relating to a payment, where that data is stored in database 130 rather than in a blockchain.

A value 195 of a metric 166 need not be based on a last value of the metric 166, however. For example, a metric 166 may represent whether an entity is delinquent in payments for more than a given period of time (e.g., thirty days, sixty days, ninety days, etc.). A value 195 of such a metric 166 is not based on the metric's last value.

In one implementation, a metric 166 includes, or is associated with, code that allows for determining the value 195 of the metric 166. In such an implementation, determining a value 195 of a metric 166 includes executing the code. In another implementation, determining the value 195 of a metric 166 may include 1) storing, on the blockchain, the data relating to the payment (and other data) on which determining the value 195 is based, and 2) the execution of a smart contract to determine the value 195 (a smart contract is executable code, stored in a blockchain, that is executed automatically responsive to an operation on the blockchain). From block 190, flow passes to block 192.

Store the Value in the Blockchain

In block 192, the value 195 of the metric 166 is stored in the blockchain (e.g., in blockchain 599, described below referring to FIG. 5B) with an identifier that uniquely identifies the second tenant in the blockchain (i.e., second tenant ID 198). In one implementation, the value 195 is stored in a blockchain via blockchain services interface 199. In some implementations, the value 195 of the metric 166 and second tenant ID 198 are stored in an object such as metric value 193. Metric value 193 may also include one or more of the following attributes: 1) first tenant ID 197 (i.e., an identifier that uniquely identifies the tenant that caused the value to be stored (e.g., the payee)); 2) metric ID 194 (i.e., an identifier for the metric 166, such as ID 169); and 3) timestamp 196 (i.e., a value corresponding to the time and/or date at which value 195 was determined, metric value 193 was stored, etc.). Implementations may include other attributes in metric value 193; e.g., data on which the determination of value 195 was based (e.g., if the data is not stored in the blockchain); an identifier for the entity to which the value 195 relates, if the entity is not a tenant in the multi-tenant system (e.g., an ID issued by a private sector entity, such as a Dun & Bradstreet D-U-N-S® number; an ID issued by a government entity, such as a taxpayer identification number or company registration number; etc.); etc.

Deployment Options

Implementations may be deployed in different ways. One implementation is deployed as a multi-tenant system, where database 130 is offered by a multi-tenant DBMS. A multi-tenant DBMS is a DBMS that provides one or more services to tenants using one or more multi-tenant databases. For example, a given database server may simultaneously process requests for many tenants, and a given DBO potentially stores records for many more tenants. In one implementation, database 130 is reserved to a first tenant and block 182 is performed by the multi-tenant system (e.g., a multi-tenant CRM system) based on the database 130 reserved to the first tenant. In another implementation, one or more of payment processing engine 100, database 130, metadata repository 163, and application server 180 are deployed on-premise (i.e., in a computing environment owned or controlled by the entity using such components). In such an implementation, block 182 may be performed by a daemon (i.e., a background process executing on an electronic device).

Triggers for Automatically Storing Metric Values

Implementations have been described where a value 195 for a metric 166 is automatically stored responsive to payment gateway 115 returning response 118. Other implementations may store a value 195 responsive to a different trigger. In one implementation, a value 195 is automatically stored responsive to payment gateway 115 returning response 118; i.e., synchronously. In another implementation, a value 195 is automatically stored responsive to an insertion or update of a record 160 in database 130 (e.g., by way of an event being published, a database trigger being executed, etc.). In yet other implementations, a value 195 is stored responsive to execution of a job (e.g., a scheduled or ad-hoc job); i.e., asynchronously. Thus, different implementations may represent a continuum of ways, in terms of immediacy after a payment is processed, made, or missed, that a value 195 of a metric 166 can be automatically stored.

Figure 1B:
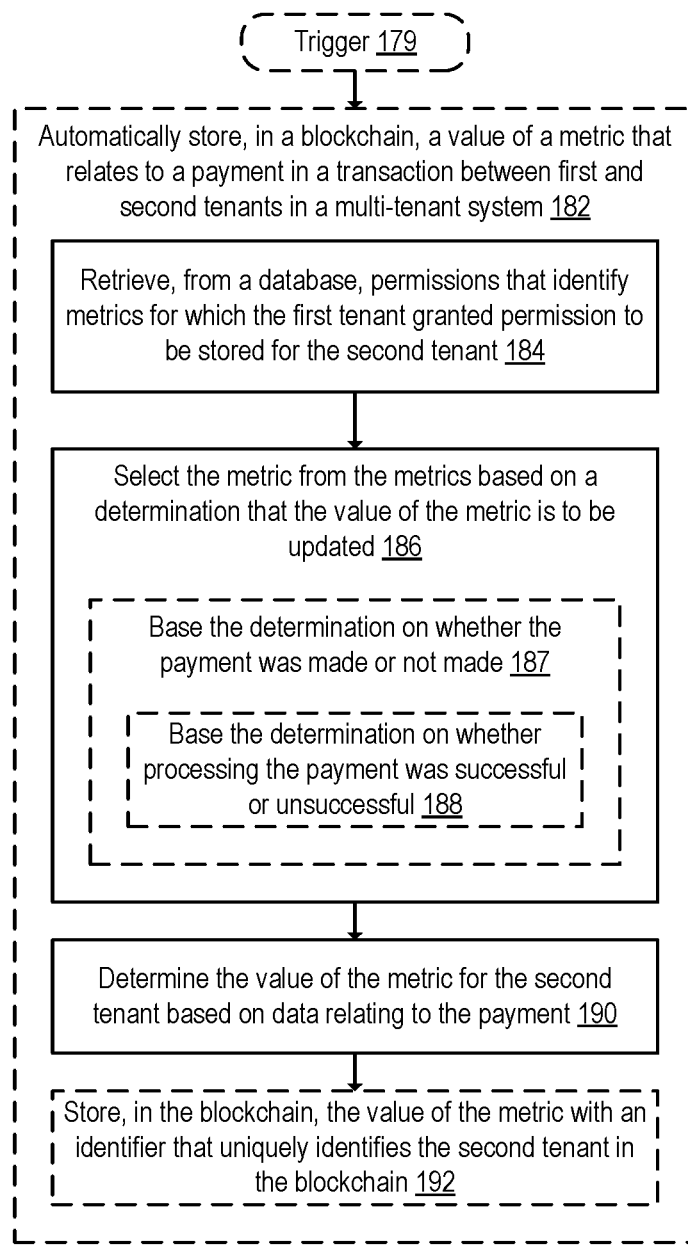
FIG. 1B is a flow diagram that shows methods for automatically storing metrics relating to payments in a blockchain, according to some implementations.

Different triggers are represented by trigger 179 in FIG. 1B. FIG. 1B is a flow diagram that shows methods for automatically storing metrics 166 relating to payments in a blockchain, according to some implementations. Block 182, block 184, block 188, block 190, and block 192 were described referring to FIG. 1A.

In block 186, the metric 166 is selected based on a determination that the value 195 of the metric 166 is to be updated, as previously described. Some implementations include block 187. In block 187, the determination is based on whether the payment was made or not made. In turn, whether a payment was made or not made may be based on whether processing the payment was successful or unsuccessful, per block 188. However, a value of a certain metric 166 might not depend on whether processing a payment was successful or unsuccessful. For example, a metric 166 might represent a number of late payments in the past year (i.e., the number of times, in the past year, that a payment was not paid by its due date). The value 195 of such a metric 166 depends on whether a payment was not made by its due date rather than on whether processing the payment was successful or unsuccessful. Alternatively, a value of a metric 166 might depend on one or more of whether processing a payment was successful, whether the processing the payment was unsuccessful, whether the payment was made, whether the payment was not made, etc. For example, a metric 166 might represent a number of payments that are currently overdue. A value 195 of such a metric 166 is sensitive to the successful processing of a payment that is currently overdue (which may reduce the number of payments that are currently overdue). However, a value 195 of metric 166D is also sensitive to a payment not being made by a date that the payment is due (which may increase the number of payments that are currently overdue).

Implementations include performing block 182 responsive to trigger 179, as FIG. 1B shows. In one implementation, trigger 179 might include a response 118 from a payment gateway 115 (such as indicated in FIG. 1A by the dashed arrow between block 121 and block 182). In other implementations, trigger 179 might include other operations, as discussed in more detail later herein.

Updating or Inserting a Record in a Database

Figure 2A:
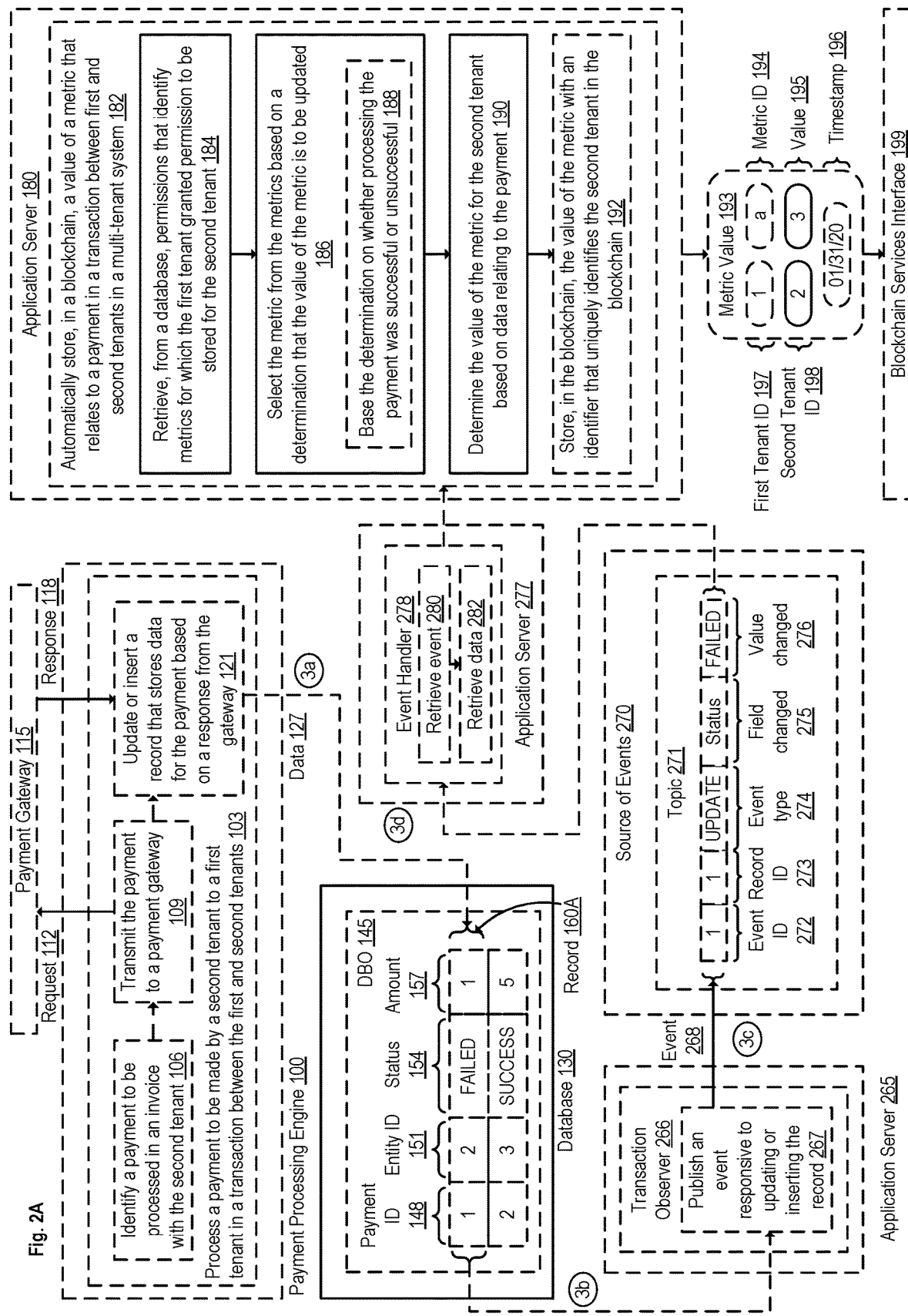
FIG. 2A is a block diagram that shows systems for automatically storing metrics relating to payments in a blockchain, responsive to updating or inserting a record that stores data relating to a payment in a database, according to some implementations.

FIG. 2A is a block diagram that shows systems for automatically storing metrics relating to payments in a blockchain, responsive to updating or inserting a record that stores data relating to a payment in a database, according to some implementations. Payment processing engine 100, payment gateway 115, database 130, application server 180, and blockchain services interface 199 were described referring to FIG. 1A.

Relative to FIG. 1A, FIG. 2A also shows application server 265, source of events 270, and application server 277. For brevity, FIG. 2A only shows DBO 145 in database 130. However, implementations may include other DBOs in database 130 (e.g., DBO 133 shown in FIG. 1A).

In block 121, data 127 is stored in database 130 responsive to receiving response 118 from payment gateway 115, as previously described. Specifically, at time 3a (indicated by circled reference "3a") in block 121, record 160A is updated or inserted with data 127. Record 160A was described referring to FIG. 1A.

At time 3b (indicated by circled reference "3b"), the insertion or update of record 160A is indicated to application server 265. Indicating an insertion or update of record 160 to application server 265 is performed in different ways in different implementations. In one implementation, database 130 is configured to indicate the change to application server 265. Database 130 may indicate the change via a push mechanism. For example, database 130 may include a database trigger that is executed responsive to updating or inserting a record 160 in DBO 145, and executing the database trigger causes code in application server 265 to be called or executed. In another implementation, the change in database 130 may be indicated to application server 265 via a pull mechanism. For example, application server 265 may monitor database 130 such that application server 265 detects when a record 160 in DBO 145 is updated or inserted. In one implementation, application server 265 may include transaction observer 266 that is called responsive to a change in state of a transaction (e.g., the transaction being committed), where the transaction includes updating or inserting a record 160 in DBO 145.

In another implementation, the insertion or update of record 160A is not indicated to application server 265. Instead, a component that resulted in the insertion or update also causes the publication of event 268. For example, an implementation may allow a user to manually enter data relating to a payment (e.g., update or insert a record 160), such as through a graphical user interface (GUI). The GUI may also cause the publication of event 268 after the data is entered (and thus the record 160 is inserted or updated). Alternatively, payment processing engine 100 may publish event 268 after performing block 121.

Publishing Events to a Source of Events

At time 3b, block 267 is performed. Block 267 includes publishing an event 268 responsive to updating or inserting a record 160. Specifically, at time 3c, event 268 is published to source of events 270 responsive to the insertion or update of record 160A. A source of events is a source of data from which an event can be read (e.g., a datastore, a database, a message bus, an event bus, a stream, a cache, etc.). An event is an identifiable unit of data that conveys information about an occurrence or entity. For example, an event may convey that a record 160 of a database 130 has been updated or inserted. Typically, an event includes one or more attributes. In some implementations, an event is associated with a topic; i.e., a common characteristic.

As shown in source of events 270, event 268 is associated with topic 271. An event 268 can be associated with a topic 271 in different ways. In one implementation, an event 268 can be associated with a topic 271 in part by including a topic ID in the event 268. The topic ID may be included in the payload and/or in a header of the event 268. In another implementation, an event 268 can be associated with a topic 271 without including a topic ID in the event. For example, an event 268 may be published by calling an application programming interface (API) endpoint with the event 268 (or data comprising the event) and an identifier for the topic 271 with which the event 268 is to be associated.

In some implementations, the topic 271 with which an event 268 is associated is identified by an identifier for the DBO 145 in which the record 160A was updated or inserted. Other implementations use different approaches for identifying the topic 271 with which an event 268 is associated. For example, an event 268 might be associated with an identifier for database 130, or with an identifier that describes the DBO 145 in which the record 160 was updated or inserted, etc.

As FIG. 2A shows, an event 268 may include various attributes: event ID 272 (to store an ID for the event 268); record ID 273 (to store an ID for the record 160 to which the event 268 relates); event type 274 (to store whether the record 160 was updated, inserted, etc.); field changed 275 (to store IDs for one or more fields that were changed in record 160); and value changed 276 (to store values for the one or more fields that were changed).

Implementations may treat one or more of these attributes as optional, and/or include other attributes not shown in FIG. 2A. For example, an implementation might omit record ID 273 from an event 268. An implementation might include other or omit attributes for certain topics 271 and not for others, or for certain event types 274 and not for others. For example, an implementation might include an attribute for each field of record 160 that stores a value that was changed (e.g., updated or inserted) and an attribute for each such value that was changed. Other attributes might be included; e.g., one or more of 1) a timestamp corresponding to when a record 160 was updated or inserted; 2) a timestamp corresponding to when the transaction that included the update or insertion was started; 3) a timestamp corresponding to when that transaction was committed; etc.

Event 268 includes the following attributes and corresponding values: 1) a value of "1" for event ID 272; 3) a value of "1" for record ID 273 (corresponding to the value "1" for payment ID 148 of record 160A); 4) a value of "UPDATE" for event type 274 (indicating that record 160A was updated in DBO 145); 5) a value of "Status" for field changed 275 (indicating that a value of status 154 was updated for record 160A); and 6) a value of "FAILED" for value changed 276 (corresponding to the value "FAILED" of status 154 of record 160A).

Retrieving Events from the Source of Events

When an event 268 has been published to the source of events 270, the event 268 can be read from the source of events 270. FIG. 2A shows application server 277 which includes event handler 278. In one implementation, event handler 278 includes blocks 280 and 282.

In block 280, an event 268 published responsive to an update or insertion in DBO 145 is retrieved from the source of events 270. In the example shown in FIG. 2A, at time 3d, event 268 is retrieved from the source of events 270.

In implementations based on a publish-subscribe messaging system, event handler 278 subscribes to a topic 271 to receive events 268 published to the source of events 270 that are associated with that topic 271. For example, in such implementations, event handler 278 may subscribe to topic 271 to receive events 268 associated with topic 271 (e.g., events 268 published responsive to updates or insertions of records 160 in DBO 145). In some implementations, event handler 278 is notified when an event 268 that is associated with topic 271 (to which the event handler has subscribed) is published to the source of events 270, and event handler 278 can then retrieve the event 268. In other implementations, an event 268 is pushed to event handler 278; e.g., by calling block 280. Additionally, or alternatively, event handler 278 can poll source of events 270 (e.g., at predefined intervals) to determine whether an event 268 has been published. These techniques are exemplary and not limiting. For example, implementations may be based on message queueing, and thus publishing an event 268 might include publishing the event 268 to a message queue read by event handler 278. Alternatively, an event 268 may be broadcast to a channel and read by event handler 278 connected to the channel Rather than use a source of events 270 that supports multiple topics 271, some implementations may use a different configuration; e.g., a source of events 270 per topic 271. From block 280, flow passes to block 282.

In block 282, data relating to the payment is retrieved. For example, in one implementation, block 282 includes retrieving data from record 160A in DBO 145; e.g., by requesting the record with payment ID 148 with a value of "1," corresponding to the value of "1" in record ID 273 of event 268. Retrieving data from record 160A in block 282 facilitates using that data in block 182. For example, block 190 includes determining the value 195 of a metric 166 based on data relating to the payment.

In one implementation, event handler 278 invokes (e.g., calls) block 182 in application server 180 to automatically store a value 195 of a metric 166. In another implementation, application server 180 includes event handler 278 (and thus application server 277 and application server 180 are the same application server).

Figure 2B:
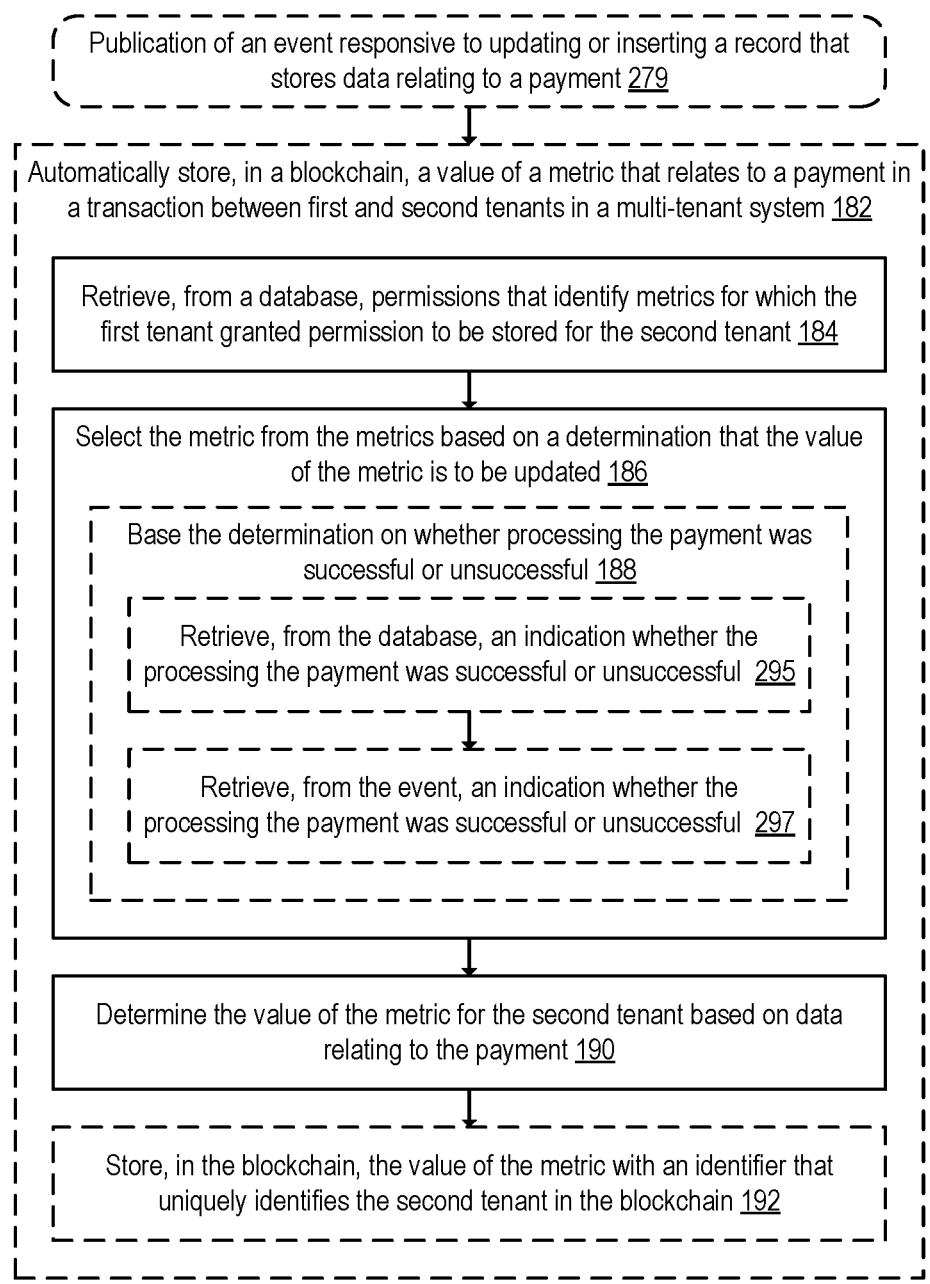
FIG. 2B is a flow diagram that shows methods for automatically storing metrics relating to payments in a blockchain, responsive to updating or inserting a record that stores data relating to a payment in a database, according to some implementations.

FIG. 2B is a flow diagram that shows methods for automatically storing metrics relating to payments in a blockchain, responsive to updating or inserting a record that stores data relating to a payment in a database, according to some implementations.

As shown in FIG. 2B, in some implementations, block 182 is performed responsive to trigger 279. Trigger 279 is publication of an event 268 responsive to updating or inserting a record 160 that stores data relating to a payment. Block 182 was described previously.

Some implementations include one or both of block 295 and block 297. In block 295, an indication whether the processing the payment was successful or unsuccessful is retrieved from database 130. For example, referring to FIG. 2A, a value of status 154 can be retrieved from DBO 145 of a record 160 that was inserted or updated responsive to a payment being processed. From block 295, flow passes to block 297 (if supported).

In block 297, an indication whether the processing the payment was successful or unsuccessful is retrieved from the event 268. For example, referring to FIG. 2A, a value of value changed 276 (e.g., "FAILED") is retrieved from event 268 where the value of field changed 275 (e.g., "Status") corresponds to status 154 of a record 160 that was updated or inserted responsive to a payment being processed.

Other implementations may not include block 295 and/or block 297. For example, data relating to the payment may be provided to block 182 by event handler 278. Additionally, or alternatively, block 295 and/or block 297 may correspond to, or be included in, block 282 and/or block 280 of event handler 278.

Implementations which automatically store metrics 166 relating to payments in a blockchain, responsive to updating or inserting a record 160 in database 130, allow for looser coupling between components. For example, such an implementation may allow for retrofitting an existing system that includes payment processing engine 100 and database 130 to support automatically storing metrics. Specifically, the existing system could be retrofitted with application server 265, source of events 270, application server 277, and application server 180 (if the existing system does not already include these components).

Other advantages are possible. In implementations which support automatically storing a value 195 of a metric 166 responsive to publication of an event 268, more than one event 268 can be retrieved from source of events 270 before block 182 is performed. Thus, one or more values 195 for one or more metrics 166 can be automatically stored in bulk. This in turn may improve system efficiency. For example, permissions that identify metrics 166 to be stored need only be retrieved in block 184 once responsive to multiple payments being processed. This reduces the number of requests submitted to database 130, the number of responses that database 130 transmits, and thus input/output and processing overhead on one or more of database 130 and application server 180. In another example, more than one value 195 for the one or more metrics 166 may be stored in the blockchain in bulk (e.g., in one block rather than several blocks). This reduces overhead associated with storing data in the blockchain (e.g., processor cycles, network communications, use of storage media, etc.). Additionally, or alternatively, events 268 may be retrieved from source of events 270 at specific times. For example, events 268 may be retrieved, and values 195 of metrics 166 automatically stored, when load on a blockchain (e.g., blockchain 599) is relatively low (e.g., the average number of transactions performed on the blockchain per a given interval of time is less than a threshold). In turn, this may allow for better response times in blockchain transactions, optimizing utilization rates of the underlying infrastructure, etc.

It should be noted that implementations are described where a value 195 of a metric 166 is automatically stored responsive to publication of an event 268. Other implementations may automatically store the value 195 responsive to another trigger 179 which is nonetheless based on an insertion or update of a record 160 in database 130. For example, an implementation may include code (e.g., in application server 180) that 1) polls database 130 to detect whether a record 160 has been inserted or updated responsive to a payment being processed, made, and/or missed; and 2) acts as a trigger 179 responsive to which block 182 is performed. Alternatively, such code could be invoked in execution of a database trigger responsive to insertion or update of a record 160 in database 130. Such implementations may provide similar advantages to those already described.

Ad-Hoc or Scheduled Job

Figure 3A:
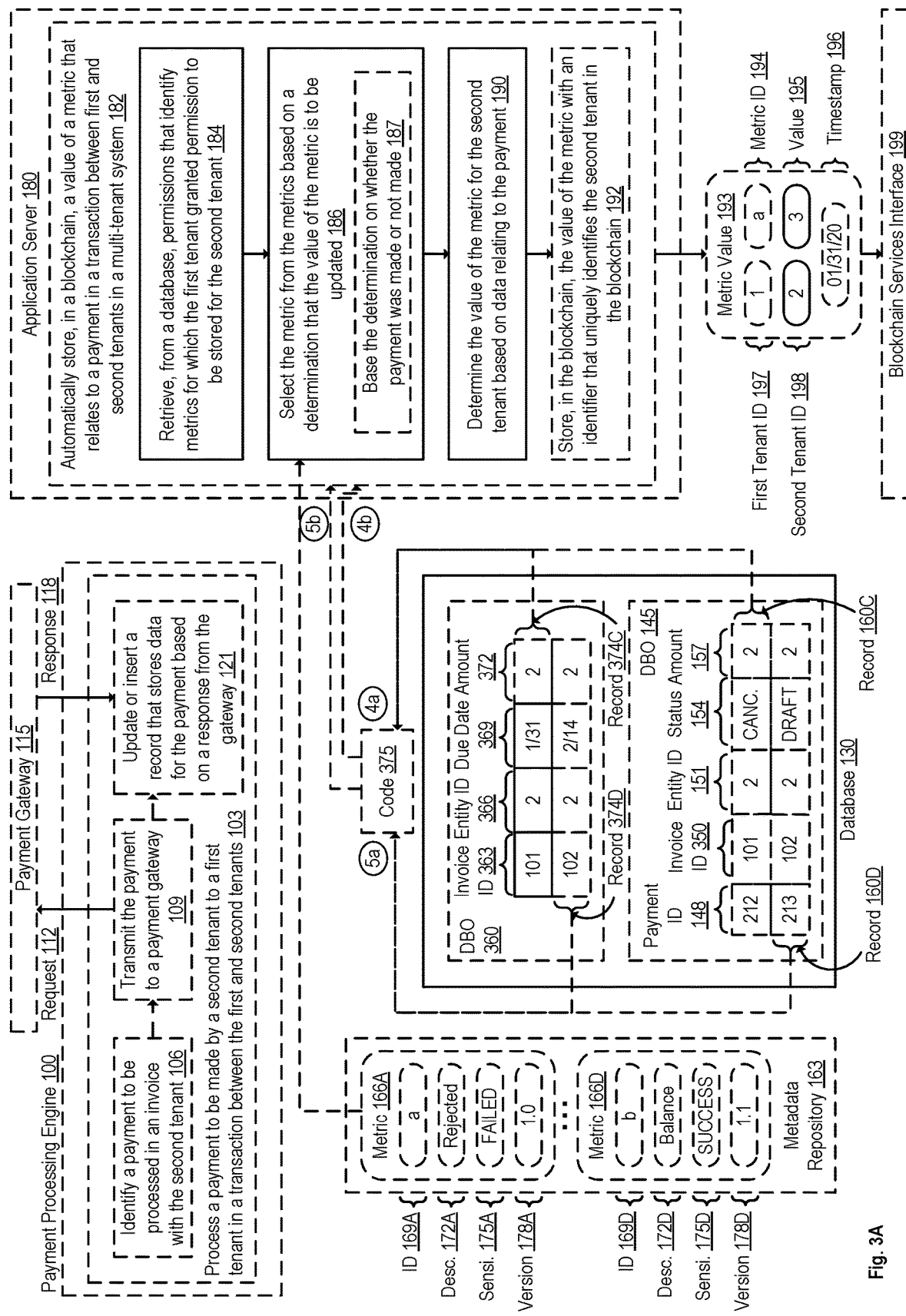
FIG. 3A is a block diagram that shows systems for automatically storing metrics relating to payments in a blockchain, responsive to execution of a job, according to some implementations.

FIG. 3A is a block diagram that shows systems for automatically storing metrics relating to payments in a blockchain, responsive to execution of a job, according to some implementations. Payment processing engine 100, payment gateway 115, database 130, metadata repository 163, application server 180, and blockchain services interface 199 were described referring to FIG. 1A.

Relative to FIG. 1A, FIG. 3A also shows database 130 with DBO 360. DBO 360 includes various fields for a record 374: invoice ID 363 (to store a value that identifies an invoice); entity ID 366 (to store a value that identifies an entity (e.g., a tenant) to which the invoice relates); due date 369 (to store a value that represents the invoice's due date); and amount 372 (to store a value corresponding to an amount, in a unit of currency, due under the invoice). DBO 360 includes record 374C and record 374D. Record 374C includes the following values: a value of "101" for invoice ID 363; a value of "2" for entity ID 366; a value of "1/31" for due date 369; and a value of "2" for amount 372. Thus, record 374C represents an invoice "101," with an entity "2," due on January 31, for an amount of "2." Record 374D includes the following values: a value of "102" for invoice ID 363; a value of "2" for entity ID 366; a value of "2/14" for due date 369; and a value of "2" for amount 372. Thus, record 374D represents an invoice "102," with an entity "2," due on February 14, for an amount of "2."

DBO 145 additionally includes invoice ID 350 relative to DBO 145 shown in FIG. 1A. For a record 160, invoice ID 350 stores a value that identifies an invoice (e.g., a record 374 in DBO 360). DBO 145 as shown in FIG. 3A includes record 160C and record 160D. Record 160C includes a value of: 1) "212" for payment ID 148; 2) "101" for invoice ID 350 (corresponding to record 374C in DBO 360); 3) "2" for entity ID 151; 4) "CANC." for status 154 (indicating that the payment was cancelled); and 4) "2" for amount 157. Thus, record 160C stores data describing a payment with ID "212," corresponding to invoice "101," for an amount of "2," from an entity with ID "2," the processing of which was cancelled. Record 160D includes a value of: 1) "213" for payment ID 148; 2) "102" for invoice ID 350 (corresponding to record 374C in DBO 360); 3) "2" for entity ID 151; 4) "DRAFT" for status 154; and 4) "2" for amount 157. Thus, record 160D stores data describing a payment with ID "213," corresponding to invoice "102," for an amount of "2" from an entity with ID "2," the status of which is "draft" (e.g., not yet to be submitted for processing).

FIG. 3A also shows code 375. Code 375 may be executed on an electronic device as part of a executing a job (whether on a scheduled or an ad-hoc basis). Implementations may also include performing block 182 as part of the job. In one implementation, code 375 includes instructions for identifying, and retrieving, one or more records 160 that were inserted or updated in DBO 145. Identifying such records 160 can be performed in different ways. In one implementation, 1) a record 160 (or DBO 145) includes a timestamp or other data (e.g., a commit identifier) that indicates when record 160 was updated or inserted; and 2) code 375 includes instructions for comparing the timestamp or other data with a previous timestamp or data to indicate which records 160 were updated or inserted since the last execution of code 375. In another implementation, 1) a record 160 includes a value (e.g., a flag) that indicates whether the record 160 was updated or inserted since the last execution of code 375; and 2) code 375 includes instructions for retrieving only those of records 160 with such a value indicating that they were updated or inserted since the last execution of code 375. In yet other implementations, the timestamp or value is stored elsewhere than in record 160 (e.g., in a separate DBO in database 130). Additionally, or alternatively, code 375 stores a value of payment ID 148 corresponding to the last record 160 that was inserted or updated in the last execution of code 375.

After the records 160 that were inserted or updated in DBO 145 are identified, those records 160 can be retrieved by code 375. For example, code 375 can query database 130 to retrieve those records 160.

In another implementation, code 375 includes instructions for identifying one or more payments that were made or not made. Implementations may identify whether a payment was made or not made based on whether the payment was processed successfully or unsuccessfully, which may be indicated in DBO 145 (e.g., in status 154). Other implementations may identify whether a payment was made or not made in a different way. For example, an implementation might only store a record 160 for a payment if the payment is processed successfully. Another implementation might only store a record 160 if a payment is processed successfully or unsuccessfully (and not, for example, if the payment is currently due to be paid). Thus, implementations may query DBO 360 to determine which invoices have one or more payments that are due, and for each such invoice, determine if a payment was made or not made. An implementation could accomplish this by 1) retrieving records 374 from DBO 360 where the due date 369 has passed (e.g., the due date 369 precedes the current date); and 2) determining, for each such record 374, if DBO 145 includes a corresponding record 160 (i.e., a record 160 with a corresponding value of invoice ID 350) indicating that a corresponding payment was successfully processed. In one implementation, a payment was not made if such a corresponding record 160 does not exist.

By way of a concrete example, at time 4a (indicated with circled reference "4a"), code 375 causes record 160C to be identified as a record 160 that was inserted or updated in DBO 145, and retrieved from DBO 145, as indicated by the dashed line between record 160C and code 375. Additionally, or alternatively, code 375 may cause record 374C to be identified as representing an invoice for which a payment was not made (e.g., because the due date 369 with a value of "1/31" for record 374C predates a current date, and the payment with payment ID 148 with a value of "212" represented by record 160C has a value of "CANC." (or cancelled") for status 154), as indicated by the dashed line between record 374C and code 375. Responsive to determining that one or more records 160 were inserted or updated, and/or that one or more payments were made or not made, code 375 causes block 182 to be performed at time 4*b* (indicated with circled reference "4*b*").

By way of another example, at time 5*a* (indicated with circled reference "5*a*"), code 375 causes record 160D to be identified as a record 160 that was inserted or updated in DBO 145, and retrieved from DBO 145, as indicated by the dashed line between record 160D and code 375. Additionally, or alternatively, code 375 may cause record 374D to be identified as representing an invoice for which a payment was not made (e.g., because the due date 369 with a value of "2/14" for record 374C predates a current date, and the payment with payment ID 148 with a value of "213" represented by record 160D has a value of "DRAFT" for status 154), as indicated by the dashed line between record 374D and code 375. Responsive to determining that one or more records 160 were inserted or updated, and/or that one or more payments were made or not made, code 375 causes block 182 to be performed at time 5*b* (indicated with circled reference "5*b*").

Figure 3B:
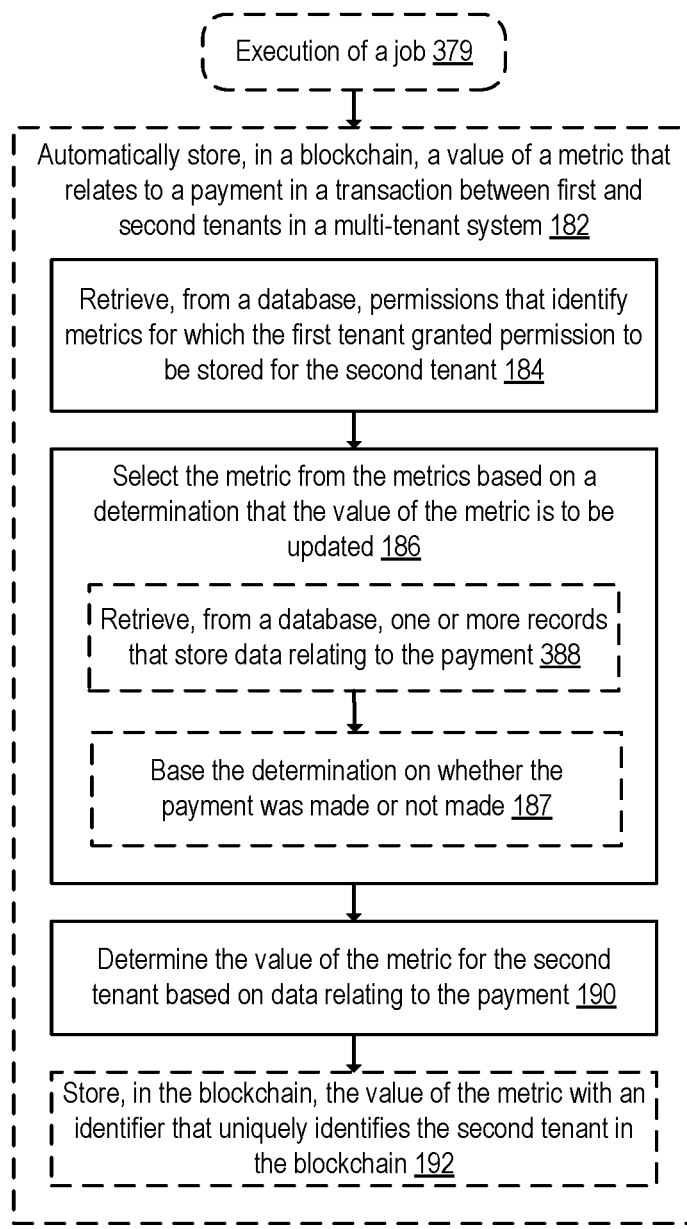
FIG. 3B is a flow diagram that shows methods for automatically storing metrics relating to payments in a blockchain, responsive to execution of a job, according to some implementations.

FIG. 3B is a flow diagram that shows methods for automatically storing metrics relating to payments in a blockchain, responsive to execution of a job, according to some implementations. Block 182, block 184, block 186, block 187, block 190, and block 192 were discussed previously.

Block 186 may include block 388. In block 388, one or more records 160 that store data relating to the payment are retrieved from database 130. For example, at or after time 4*b*, record 160C is retrieved from database 130; and at or after time 5*b*, record 160D is retrieved from database 130. Other implementations may not include block 186, however. For example, implementations may include 1) retrieving one or more records 160 before block 182 is performed (e.g., during execution of code 375), and 2) providing the data relating to payments to block 182 (e.g., when block 182 is invoked, which may occur responsive to trigger 379; i.e., responsive to execution of a job). From block 388, flow passes to block 187, which has been described previously.

Implementations that support automatically storing a value 195 of a metric 166 responsive to execution of a job provide various advantages. For example, a job may be scheduled to run (i.e., be executed) at predefined intervals of time, such as once per day at an appropriate time of day (e.g., when the rate of transactions on the blockchain are relatively low compared to other times of the day). This allows for better management of the underlying infrastructure, such as database 130, application server 180, blockchain (e.g., blockchain 599), etc. Scheduling a job in this manner also allows for identifying payments that were not made on the day preceding the day on which the job is executed. This may facilitate identifying overdue payments if the overdue payments are not identified otherwise (e.g., because draft payments are not automatically created on the day that the payment is due). In turn, one or more values 195 for one or more metrics 166 that relate to overdue payments can be automatically stored; e.g., a metric that represents a number of payments that are currently overdue, a metric that represents the balance of overdue payments, a metric that represents number of payments that are delinquent for a given period of time (e.g., more than 30 days, more than 60 days, etc.), etc. In some implementations, rather than processing all payment data, a job may automatically store metrics 166 based on a subset of payments. For example, an implementation might: 1) queue a) a determination that the value 195 of a metric 166 is to be updated, b) an event 268, and/or c) an indication that a record 374 or record 160 was inserted or updated; and 2) process that determination, event 268, record 374 or record 160 as part of a job (e.g., in bulk). Such implementations avoid having to process all payment data to automatically store values 195 of metrics 166.

Example Datamodels

Permissions for Storing Metrics

Figure 4A:
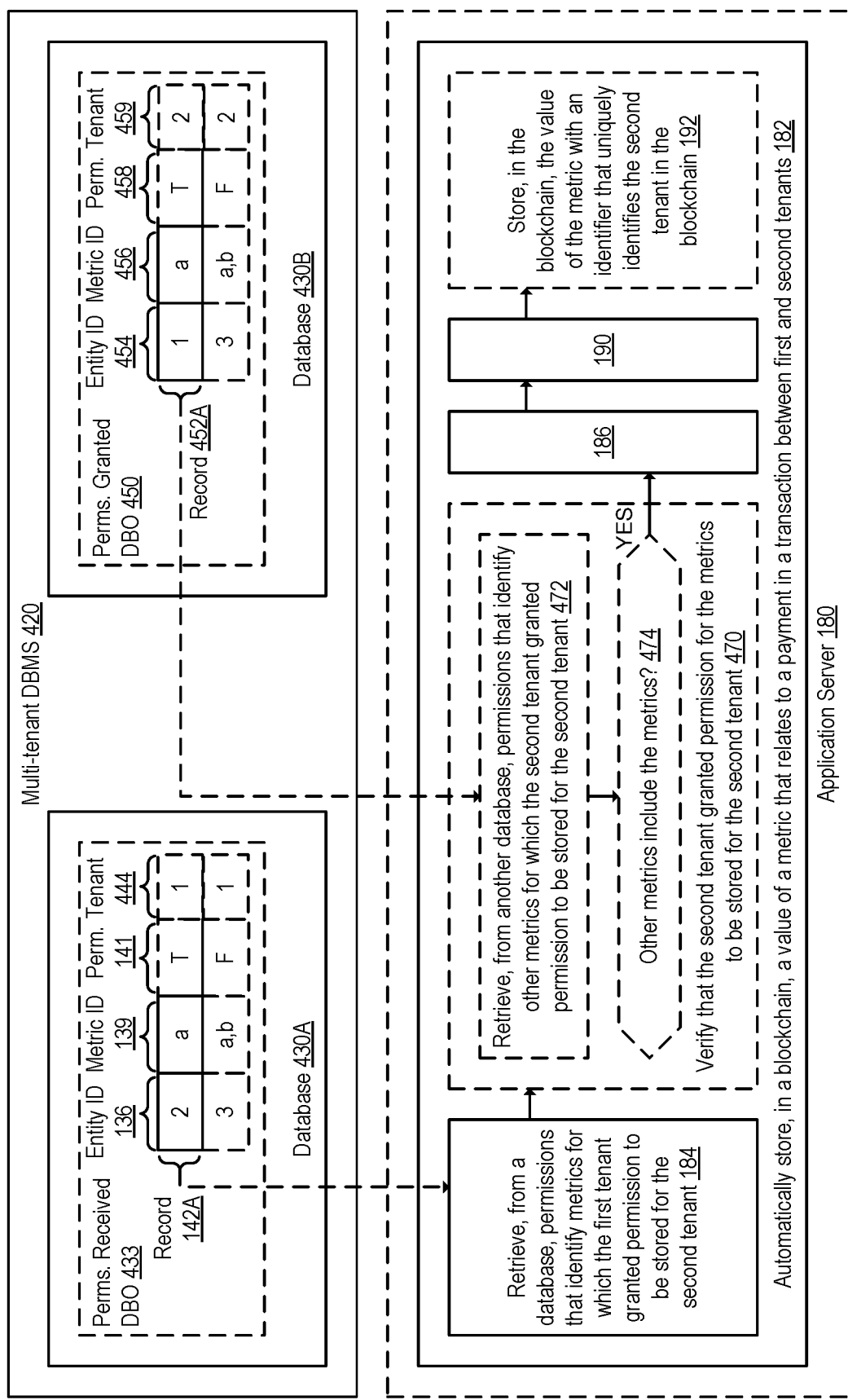
FIG. 4A is a block diagram that shows methods for verifying that a tenant granted permissions that identify metrics to be stored in the blockchain, according to some implementations.

FIG. 4A is a block diagram that shows methods for verifying that a tenant granted permissions that identify metrics to be stored in the blockchain, according to some implementations.

FIG. 4A shows a multi-tenant DBMS 420. Multi-tenant DBMS 420 includes a database 430A and a database 430B. In one implementation, database 430A is reserved to a first tenant and database 430B is reserved to a second tenant. Although FIG. 4A shows separate databases 430, other implementations may provide multi-tenancy using a single database 430. The datamodel shown in FIG. 4A is illustrative and not limiting.

Database 430A includes DBO 433 that stores data relating to permissions received (i.e., permissions received by the first tenant from other tenants, where the permissions indicate metrics that may or may not be stored for those other tenants). DBO 433 includes various fields that were described referring to DBO 133 shown in FIG. 1A: entity ID 136, metric ID 139, and perm. 141. DBO 433 also includes tenant 444, which stores an identifier for the tenant which granted (or denied) permissions for the metrics identified in a given record 142 (e.g., in data stored in metric ID 139). Thus, record 142A indicates that an entity with ID "2" granted permission to tenant with ID "1" for a metric with ID "a" to be stored in a blockchain.

Database 430B includes DBO 450 that stores data relating to permissions granted or denied (i.e., permissions granted or denied by a second tenant to other tenants, where the permissions indicate metrics that may or may not be stored for the second tenant). DBO 450 includes fields that include entity ID 454, metric ID 456, permission 458 (shown as "Perm." in FIG. 1A, for brevity), and tenant 459. Thus, record 452 in DBO 450 stores values that identify an entity (entity ID 454) for which permission was granted or denied (permission 458) to store identified metrics (metric ID 456) for the tenant (tenant 459). For a specific example, record 452A stores values that indicate that tenant with ID "2" granted permission to an entity with ID "1" to store a metric with ID "a," in the blockchain, for the tenant with ID "2."

FIG. 4A also shows application server 180, block 182, block 184, block 186, block 190, and block 192 which were described previously. FIG. 4A also shows block 470, block 472, and block 474.

As previously described, block 184 includes retrieving permissions from a database (e.g., database 430A) that identify metrics 166 to be stored for the second tenant (e.g., the tenant to which database 430B is reserved) for which a second tenant granted permission to the first tenant (i.e., the tenant to which database 430A is reserved). For example, block 184 may include retrieving record 142A which indicates that the second tenant (with a value of "2" for entity ID 136) granted permission (i.e., with a value of "T" in perm. 141) to store the metric with ID "a" (i.e., the value of "a" in metric ID 139) to the tenant with ID "1" (i.e., in tenant 444). In implementations that support block 470, flow passes from block 184 to block 470.

Block 470 includes verifying that the second tenant granted permission for the metrics to be stored for the second tenant. For example, block 470 includes verifying that the second tenant (e.g., the tenant to which database 430B is reserved) granted the first tenant (e.g., the tenant to which database 430A is reserved) permission to store the metric with ID "a." In some implementations, block 470 may include block 472 and/or block 474.

Block 472 includes retrieving, from another database, permissions that identify other metrics for which the second tenant granted permission to be stored for the second tenant. For example, block 472 may include retrieving record 452A from database 430B. Record 452A identifies metric with ID "a" (cf. metric ID 456 with a value of "a") as metrics for which the tenant with ID "2" (cf. tenant 459 with a value of "2") granted permission to be stored (cf. perm. 458 with a value of "T") to the entity with ID "1" (cf. entity ID 454 with a value of "1"). From block 472, flow passes to block 474.

In block 474, whether the other metrics (i.e., the metrics for which the second entity granted permission to be stored, "granted permissions") include the metrics (i.e., the metrics for which the first entity was granted permission to store, "received permissions") is determined. For example, an implementation can determine whether the values stored in metric ID 139 of record 142 are included in the values stored in metric ID 456 of record 452. Responsive to determining that the granted permissions include the received permissions, flow passes from block 474 to block 186, which was described previously.

Different implementations handle differently a determination that the granted permissions do not include the received permissions. In one implementation, if at least one of the received permissions is included in the granted permissions, block 186 is performed with respect to the metrics where the received permissions are included in the granted permissions. For example, if the second tenant granted permission for a metric with an ID "a" to be stored, and if the first tenant had recorded that the second entity had granted permission for metrics with IDs "a" and "b" to be stored, block 186 would be performed with respect to the metric with ID "a." In another implementation, block 186 is not performed regardless whether at least one received permissions is included in the granted permissions. Implementations may perform other operations (e.g., logging the IDs of the received permissions, logging the IDs of the granted permissions, logging whether the received permissions are included in the granted permissions, etc.).

Implementations that verify whether a tenant granted permission for metrics to be stored for that tenant, such as with block 470, provide additional guarantees of data privacy and data security. For example, that a tenant has stored in database 430B that the tenant granted permission to another tenant for a metric 166 to be stored is an indication that the tenant provided consent for the metric 166 to be stored. Laws and/or regulations may require an entity's consent before the entity's data (or data based thereon) is stored on a blockchain. Guarantees of data security are also provided. For example, if database 430A has been compromised and/or corrupted such that the values stored in metric ID 139 of a record 142 do not accurately reflect the permissions for metrics given by the corresponding tenant, verifying the permissions against the values stored in metric ID 456 of record 452 for the corresponding tenant may prevent metrics being stored on a blockchain in the absence of permission being granted to do so. This guarantee is further strengthened when the verification is performed by a host organization that provides the multi-tenant DBMS 420 which hosts the database 430.

Invoices and Payments

FIG. 4B is a diagram that shows a datamodel for storing data relating to payments and permissions for storing metrics in a blockchain, according to some implementations.

FIG. 4B shows database 430, and DBOs 433, 445, 450, and 460. DBOs 433 and 450 were described referring to FIG. 4A.

Invoice DBO 460 includes the following fields for a record 442: 1) invoice ID 363 (to store an ID for the invoice to which record 442 relates); 2) entity ID 366 (to store an ID for the entity for which the invoice was issued); 3) due date 369 (to store a date on which one or more invoice payments are due); 4) amt. 372 (to store an invoice amount); 5) balance 475 (to store a current balance for the invoice); 6) desc. 478 (to store a description for the invoice); 7) inv. date 481 (to store a date for the invoice; e.g., a date that the invoice was issued, a date that the order related to the invoice was placed, etc.); and status 483 (to store the invoice's status; e.g., whether the invoice is pending, cancelled, fulfilled, etc.).

Invoice DBO 460 includes two records; record 442A and record 442B. Record 442A includes a value of: 1) "1" for invoice ID 363; 2) "2" for invoice ID 366; 3) "1/5" for due date 369; 4) "100" for amount 372; 5) "100" for balance 475; 6) "Widgets" for description 478; 7) "12/6" for invoice date 481; and 8) "Posted" for status 483. Record 442B includes a value of: 1) "2" for invoice ID 363; 2) "3" for invoice ID 366; 3) "1/7" for due date 369; 4) "80" for amount 372; 5) "80" for balance 475; 6) "Services" for description 478; 7) "12/8" for invoice date 481; and 8) "Pending" for status 483. Invoice DBO 460 and records 442A and 442B are illustrative and not limiting; invoice DBO 460 may include none, some, or all of the fields described for a record 442, and/or one or more other fields. Also, invoice DBO 460 may include any number of records 442 with any manner of values for their respective fields.

Payment DBO 445 includes fields described previously referring to DBO 145, including ID 148, entity ID 151, status 154, and amount 157. Payment DBO 445 also includes the following fields for a record 457: invoice ID 350 (to store one or more IDs for one or more records in invoice DBO 460); desc. 453 (to store a description for a payment); and date 455 (to store a date corresponding to the status 154 for the payment).

Payment DBO 445 includes two records; record 457A and record 457B. Record 457A includes a value of: 1) "1" for ID 148; 2) "2" for entity ID 151; 3) "Processed" for status 154; 4) "100" for amount 157; 5) "1" for invoice ID 350; 6) "Install." for description 453; and 7) "1/5" for date 455. Record 457B includes a value of: 1) "2" for ID 148; 2) "3" for entity ID 151; 3) "Draft" for status 154; 4) "200" for amount 157; 5) "2" for invoice ID 350; 6) "Late" for description 453; and 7) "1/10" for date 455. Payment DBO 445 and records 457A and 457B are illustrative and not limiting; payment DBO 445 may include none, some, or all of the fields described for a record 457, and/or one or more other fields. Also, payment DBO 445 may include any number of records 457 with any manner of values for their respective fields.

As shown in FIG. 4B, record 442A relates to an invoice issued to an entity with an ID with a value of "2." As indicated by the dashed line between record 442A and record 457A, record 457A relates to a payment for the invoice to which record 442A relates. Notably, the value of "1" for invoice ID 363 of record 442A is the value of invoice ID 350 of record 457A. The payment to which record 457A relates appears to have been paid in full, and in a timely manner: 1) the value of "100" of balance 475 of record 442A is equal to the value of amount 157 of record 457A; 2) the value of "1/5" for due date 369 in record 442A is the value of date 455 of record 457A; and 3) the value of status 154 of record 457A is "Processed."

Returning to the example shown in FIG. 1A, metric 166A represents rejected payments. Relating to the payment to which record 457A relates, metric 166A would not be selected in block 188 based on a determination that the value 195 of the metric 166A is to be updated, where the determination is based on 1) whether processing the payment was successful or unsuccessful (e.g., the value of status 154 (i.e., "Processed")), and 2) the value of sensitivity 175A (i.e., "FAILED"), because the payment was successful. In contrast, metric 166D represents a current balance owed by an entity. Metric 166D would be selected in block 188 because sensitivity 175D has the value "SUCCESS" (which is satisfied by the value of status 154; i.e., "Processed").

As shown in FIG. 4B, record 442B relates to an invoice issued to an entity with an ID with a value of "3." As indicated by the dashed line between record 442B and record 457B, record 457B relates to a payment for the invoice to which record 442B relates. Notably, the value of "2" for invoice ID 363 of record 442A is the value of invoice ID 350 of record 457B. The payment to which record 457B relates appears to have been missed: 1) record 442B has a value of "80" for balance 475; and 2) the value of "1/10" for date 455 of record 457B is past the value of "1/7" for due date 369 in record 442B (thus, the payment has not been made by the due date, assuming that the system date is "1/10").

Returning to the example shown in FIG. 1A, neither metric 166A nor metric 166D would be selected in block 188 based on a determination that the value 195 of that metric 166 is to be updated, where the determination is based on 1) whether processing the payment was successful or unsuccessful (e.g., the value of status 154 (i.e., "Draft")), and 2) the value of sensitivity 175A (i.e., "FAILED") and sensitivity 175D (i.e., "SUCCESS") respectively, because the payment was neither successful nor unsuccessful. However, another metric 166 (e.g., a metric representing a number of payments that are currently overdue) may be selected.

Example Blockchains and Related Services

Figure 5A:
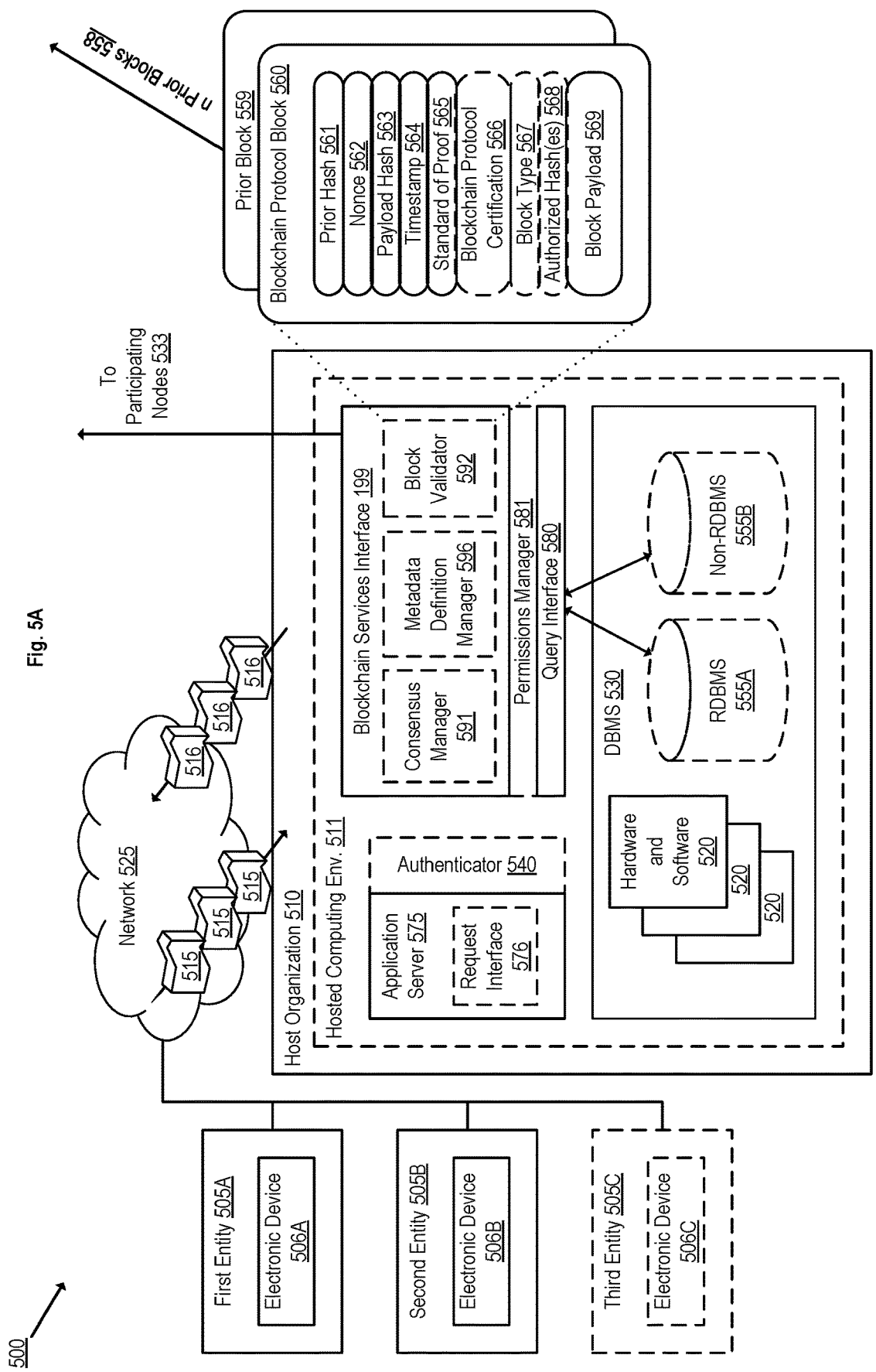
FIG. 5A is a block diagram that shows a blockchain architecture, together with a blockchain protocol block operation with a block validator, according to some implementations.

FIG. 5A is a block diagram that shows a blockchain architecture 500, together with a blockchain protocol block operation with a block validator, according to some implementations.

In one implementation, a hosted computing environment 511 is communicably interfaced with user devices 506A-C (e.g., such as mobile devices, smart phones, tablets, PCs, etc.) through host organization 510. In one implementation, a database system 530 includes database systems 555A and 555B, for example, to store code, object data, tables, datasets, and underlying database records including user data on behalf of customer organizations 505A-C (e.g., users of such a database system 530 or tenants of a multi-tenant database type database system or the affiliated users of such a database system). Such databases include various database system types including, for example, a relational database system 555A and a non-relational database system 555B according to certain implementations. One or both of relational database system 555A and non-relational database system 565B may include 1) database 130 shown in FIG. 1A, FIG. 2A, and FIG. 3A; 2) database 430 shown in FIG. 4A and FIG. 4B; and/or 3) metadata repository 163 shown in FIG. 1A and FIG. 3A. In one implementation, DBMS 530 is a multi-tenant DBMS such as multi-tenant DBMS 420 shown in FIG. 4A.

In certain implementations, a client-server computing architecture may be used to supplement features, functionality, or computing resources for the database system 530 or alternatively, a computing grid, or a pool of work servers, or some combination of hosted computing architectures may provide some or all of computational workload and processing demanded of the host organization 510 in conjunction with the database system 530.

The database system 530 depicted in the implementation shown includes a plurality of underlying hardware and software 520 that implement database functionality and a code execution environment within the host organization 510.

In accordance with one implementation, database system 530 utilizes the underlying database system implementations 555A and 555B to service database queries and other data interactions with the database system 530 that communicate with the database system 530 via the query interface 580. The hardware and software 520 of the database system 530 are separate and distinct from the customer organizations (505A, 505B, and 505C) which use web services and other service offerings as provided by the host organization 510 by communicably interfacing to the host organization 510 via network 525. In such a way, host organization 510 may implement on-demand services, on-demand database services or cloud computing services to subscribing customer organizations 505A-C.

In one implementation, each customer organization 505A-C is an entity selected from the group consisting of: a separate and distinct remote organization, an organizational group within the host organization 510, a business partner of the host organization 510, or a customer organization 505A-C that subscribes to cloud computing services provided by the host organization 510.

Further depicted is the host organization 510 receiving input and other requests 515 from customer organizations 505A-C via network 525 (such as a public Internet). For example, incoming search queries, database queries, API requests, interactions with displayed graphical user interfaces and displays at the user devices 506A-C, or other inputs may be received from the customer organizations 505A-C to be processed against the database system 530, or such queries may be constructed from the inputs and other requests 515 for execution against the database systems 555 or the query interface 580, pursuant to which results 516 are then returned to an originator or requestor, such as a user of one of a user device 506A-C at a customer organization 505A-C.

In one implementation, requests 515 are received at, or submitted to, an application server 575 within host organization 510. Host organization 510 may receive a variety of requests for processing by the host organization 510 and its database system 530. Incoming requests 515 received at application server 575 may specify which services from the host organization 510 are to be provided, such as query requests, search request, status requests, database transactions, graphical user interface requests and interactions, processing requests to retrieve, update, or store data on behalf of one of the customer organizations 505A-C, code execution requests, and so forth. Applications server 575 may be responsible for receiving requests 515 from various customer organizations 505A-C via network 525 on behalf of the query interface 580 and for providing a web-based interface or other graphical displays to an end-user user device 506A-C or machine originating such data requests 515.

Certain requests 515 received at the host organization may be directed toward a blockchain for which the blockchain services interface 199 of the host organization 510 operates as an intermediary.

The query interface 580 is capable of receiving and executing requested queries against the databases and storage components of the database system 530 and returning a result set, response, or other requested data in furtherance of the methodologies described. The query interface 580 additionally provides functionality to pass queries from application server 575 into the database system 530 for execution against the database systems 555 for processing search queries, or into the other available data stores of the host organization's computing environment 511. In one implementation, the query interface 580 implements an API through which queries may be executed against the databases systems 555 or the other data stores. Additionally, the query interface 580 provides interoperability with the blockchain services interface 199, thus permitting the host organization 510 to conduct transactions with either the database system 530 via the query interface 580 or to transact blockchain transactions onto a connected blockchain for which the host organization 510 is a participating node or is in communication with the participating nodes 533, or the host organization 510 may conduct transactions involving both data persisted by the database system 530 (accessible via the query interface 580) and involving data persisted by a connected blockchain (e.g., accessible from a participating node 533 or from a connected blockchain directly, where the host organization operates a participating node on such a blockchain).

In certain implementations, the API of the query interface 580 provides an API model through which programmers, developers, and administrators may interact with the blockchain services interface 199 or the database system 530, or both, as the needs and particular requirements of the API caller dictate.

Host organization 510 may implement a request interface 576 via application server 575 or as a stand-alone interface to receive requests packets or other requests 515 from the user devices 506A-C. Request interface 576 further supports the return of response packets or other replies, responses, and results 516 in an outgoing direction from host organization 510 to the user devices 506A-C. Authenticator 540 operates on behalf of the host organization to verify, authenticate, and otherwise credential users attempting to gain access to the host organization 510.

Further depicted within host organization 510 is the blockchain services interface 199 having included therein both a blockchain consensus manager 591 which facilitates consensus management for private and public blockchains upon which tenants, customer organizations, or the host organization itself 510 operate as a participating node 533 on a supported blockchain. Additionally depicted is the blockchain metadata definition manager 596, which enables the blockchain services interface 199 to define and create metadata (e.g., metadata 594) which is then pushed to and transacted onto a blockchain which is interfaced via the blockchain services interface 199. For instance, via the blockchain metadata definition manager 596, any customer organization 505A-C of the host organization 510 may define and create metadata which is then recorded or transacted onto the blockchain for use by that customer organization 505A-C and for use by other participating nodes 533 on the blockchain, regardless of whether or not those participating nodes 533 are also customer organizations 505A-C with the host organization 510. For example, once metadata is defined and created via the blockchain metadata definition manager 596 and pushed onto the blockchain, any participating node 533 with access to the blockchain where that metadata definition resides can then create data records and store information onto the blockchain which adopts the defined metadata definition and thus complies with the newly created metadata definition. In such a way, all participating nodes 533 can utilize information which is stored in compliance with the newly created metadata definition, as there is a standardized (albeit customized) manner for storing such data.

In one implementation, the blockchain consensus manager 591 and blockchain metadata definition manager 596 work in conjunction to implement consensus on read. A consensus on read is a specific type of consensus for controlling read access to data stored on the blockchain. Data is stored in an encrypted format where the encryption key is distributed as a shared secret with other nodes in the blockchain platform. The nodes of the network perform a consensus on read operation when a request to access the data is made. The consensus on read process examines the credentials or any configured criteria that is determined to be required, which is provided in the access request. Each node that approves of the read access responds with its portion of the shared secret that enables the requesting node to generate the key from the shared secrets to decrypt the data on the blockchain and access the data. A threshold number of secrets must be returned to enable access to the encrypted data. The threshold number can be configured and/or determined by the shared secret algorithm (e.g., Shamir's secret sharing algorithm).

In further implementations, a permissions manager 581 operates to enforce access controls and privileges as defined in metadata for data stored in the blockchain. The permissions manager 581 can enforce record, object, field or similar levels of granularity on access control including read and write access controls. The permissions manager 581 can enforce management of the blockchain data based on metadata defining access privileges based on a unique user identifier (UUID) or similar entity identifier. The metadata can define a list of entities with permission to read or write data in the blockchain. The metadata can also define a set of owners that control the consensus on read process that is used to manage the access to access controlled information. In some implementations, the permissions manager can implement a right to forget process (e.g., in compliance with European Union general data protection regulation (GDPR)) or similar process to 'erase' data from the blockchain.

As shown here, the blockchain services interface 199 communicatively interfaces the host organization 510 with other participating nodes 533 (e.g., via the network 525) so as to enable the host organization 510 to participate in available blockchain protocols by acting as a blockchain protocol compliant node, which in turn, permits the host organization 510 to access information within such a blockchain as well as enabling the host organization 510 to provide blockchain services to other participating nodes 533 for any number of blockchain protocols supported by, and offered to customers and subscribers by, the host organization 510. In certain implementations, the host organization 510 both provides the blockchain protocol upon which the host organization 510 then also operates as participating node 533. In other implementations, the host organization 510 merely operates as a participating node 533 so as to enable the host organization 510 to interact with the blockchain protocol(s) provided by others.

According to certain implementations, the blockchain metadata definition manager 596 additionally permits non-subscribers (e.g., entities which are not customer organizations 505A-C) of the host organization 510 to nevertheless utilize the blockchain metadata definition manager 596 and GUIs associated with the blockchain metadata definition manager 596 via an exposed API interface for such non-subscribing customers which may then create and define metadata definitions which are then pushed onto the blockchain via the host organization's blockchain services interface 199.

By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high *Byzantine* fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 510 provides a wide array of data processing and storage services, including the capability of providing vast amounts of data with a single responsible agent, such as the host organization 510, blockchain services differ insomuch that the host organization 510 is not a single authority for such services, but rather, via the blockchain services interface 199, is merely one of many nodes for an available blockchain protocol or operates as blockchain protocol manager and provider, while other participating nodes 533 communicating with the host organization 510 via blockchain services interface 199 collectively operate as the repository for the information stored within a blockchain by implementing compliant DLT in accordance with the available blockchain protocol offered by the host organization 510.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 533 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 533 are trusted more than any other, although this default may be altered via certain specialized blockchain protocols as will be described in greater detail below. Blockchain transactions are broadcast to the network using software, via which any participating node 533, including the host organization 510 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be used in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permission-less, there is some debate about the specific accepted definition of a so called "blockchain," such as, whether a private system with verifiers tasked and authorized (permissioned) by a central authority is considered a blockchain. Proponents of permissioned or private chains argue that the term blockchain may be applied to any data structure that groups data into time-stamped blocks. These blockchains serve as a distributed version of multi-version concurrency control (MVCC) in databases. Just as MVCC prevents two transactions from concurrently modifying a single object in a database, blockchains prevent two transactions from spending the same single output in a blockchain. Regardless of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 199 of the host organization 510, both private and public mechanisms are described herein and utilized as needed for different implementations supported by the host organization 510.

An advantage to an open, permission-less, or public, blockchain network is that guarding against bad actors is not required and no access control is needed. This means that applications may be added to the network without the approval or trust of others, using the blockchain as a transport layer. Conversely, permissioned (e.g., private) blockchains use an access control layer to govern who has access to the network. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

Figure 5B:
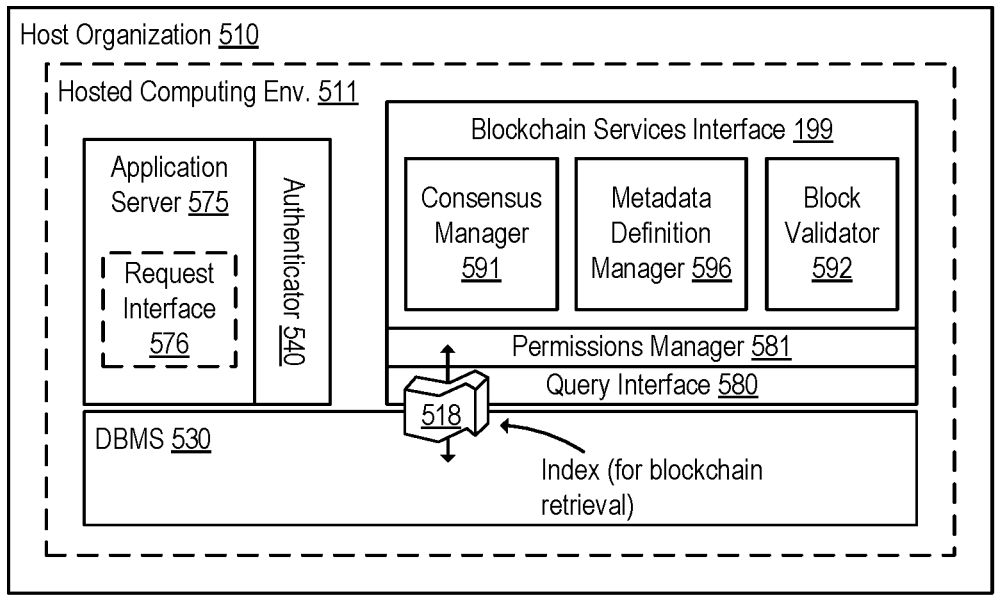
FIG. 5B is a block diagram that shows another blockchain architecture and blocks in a blockchain, according to some implementations.
Figure 5B:
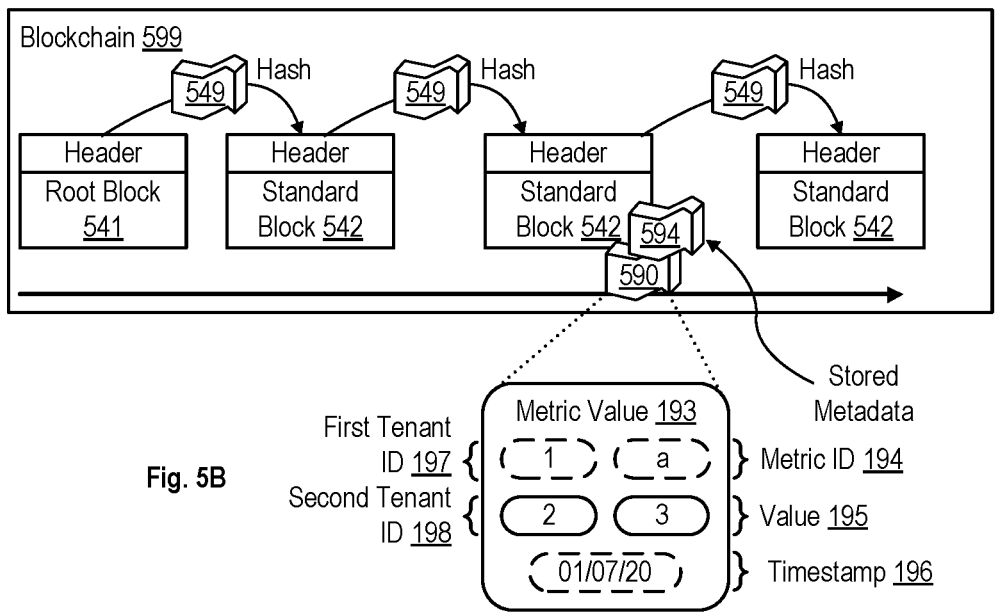

FIG. 5B also shows a blockchain protocol block 560 operating in conjunction with a block validator 592, according to some implementations. The blockchain consensus manager 591 implements consensus on read and the permissions manager 581 support access control and similar operations as described.

In particular, a blockchain protocol block 560 is depicted here to be validated by the block validator 592 of the host organization 510, with the blockchain protocol block including addition detail of its various sub-components, and certain optional elements which may be utilized in conjunction with the blockchain protocol block 560 depending on the particular blockchain protocol being utilized via the blockchain services interface 199.

In accordance with one implementation, the blockchain protocol block 560 shown defines a particular structure for how the fundamental blocks of any given blockchain protocol supported by the host organization 510 is organized.

According to some implementations, blockchain metadata definition manager 596 as shown may use a specific blockchain implementation which is provided by the host organization 510 and thus, for which the applicable blockchain protocol is defined by the host organization 510 or alternatively, the blockchain metadata definition manager 596 may use any publicly accessible blockchain for which the host organization operates as a participating node so as to establish access or the blockchain metadata definition manager 596 may use a private blockchain, including those which are not provided by the host organization 510, so long as the host organization is able to authenticate with such a private blockchain and access the blockchain by operating as a participating node on the private blockchain.

As described in greater detail below, the blockchain metadata definition manager 596 implements a specialized metadata definition and creation scheme which may include the use of GUIs and other user-friendly interfaces which are provided by the host organization 510 either via an API or via an interface of the host organization, such as the application server 575 via which users and customer organizations 505A-C may interact with the host organization 510 and more particularly, with the services and applications provided by the host organization 510, including use of GUIs provided by the blockchain metadata definition manager 596 which is made accessible to tenants of the host organization via the cloud computing platform and in certain implementations made available to non-tenants and non-subscribers of the host organization 510, either of which may then utilize the GUIs and functionality provided by the blockchain metadata definition manager 596.

In some implementations, the host organization 510 may need to provide a customized blockchain protocol implementation to support use of the specialized metadata definition and creation scheme as the blockchain metadata definition manager 596 implements. However, in implementations where the metadata may permissibly be defined and stored onto a blockchain by the host organization 510, any blockchain used to store such data will be unaffected as the blockchain is agnostic as to what types of metadata is defined or created and transacted onto the blockchain by the host organization 510. Put differently, while the host organization 510 facilitates the definition and creation of such metadata and transacts that information onto a blockchain, it is immaterial to the blockchain as to what applications elect to use such data, whereas the host organization 510 facilitates a platform in which applications may elect to only use data which is in compliance with the defined and created metadata, thus permitting transferability of such data, as well as other benefits.

With respect to the blockchain protocol block 560 (regardless of whether it is an existing and already available blockchain protocol or a custom implemented blockchain protocol), the prior hash 561 is the result of a non-reversible mathematical computation using data from the prior block 559 as the input. The prior block 559 in turn utilized data from the n previous block(s) 558 to form the non-reversible mathematical computation forming the prior hash for those respective blocks. For instance, according to one implementation, the non-reversible mathematical computation used is a SHA256 hash function, although other hash functions may be used. According to such an implementation, the hash function results in any change to data in the prior block 559 or any of the n previous blocks 558 in the chain, causing an unpredictable change in the hash of those prior blocks, and consequently, invalidating the present or current blockchain protocol block 560. Prior hash 561 creates the link between blocks, chaining them together to form the current blockchain protocol block 560.

When the block validator 592 calculates the prior hash 561 for the prior block 559, the hash must meet certain criteria defined by data stored as the standard of proof 565. For instance, in one implementation, this standard of proof 565 is a number that the calculated hash must be less than. Because the output of the hashing function is unpredictable, it cannot be known before the hash is calculated what input will result in an output that is less than the standard of proof 565. The nonce 562 is used to vary the data content of the block, allowing for a large number of different outputs to be produced by the hash function in pursuit of an output that meets the standard of proof 565, thus making it exceedingly computationally expensive (and therefore statistically improbable) of producing a valid block with a nonce 562 that results in a hash value meeting the criteria of the standard of proof 565.

Payload hash 563 provides a hash of the data stored within the block payload 569 portion of the blockchain protocol block 560 and need not meet any specific standard of proof 565. However, the payload hash is included as part of the input when the hash is calculated for the purpose of storing as the prior hash 561 for the next or subsequent block. Timestamp 564 indicates what time the blockchain protocol block 560 was created within a certain range of error. According to certain blockchain protocol implementations provided via the blockchain services interface 199, the distributed network of users (e.g., blockchain protocol nodes) checks the timestamp 564 against their own known time and will reject any block having a timestamp 564 which exceeds an error threshold, however, such functionality is optional and may be required by certain blockchain protocols and not used by others.

The blockchain protocol certification 566 defines the required size and/or data structure of the block payload 569 as well as certifying compliance with a particular blockchain protocol implementation, and thus, certifies the blockchain protocol block subscribes to, implements, and honors the particular requirements and configuration options for the indicated blockchain protocol. The blockchain protocol certification 566 may also indicate a version of a given blockchain protocol and the blockchain protocol may permit limited backward and forward compatibility for blocks before nodes will begin to reject new blockchain protocol blocks for non-compliance.

Block type 567 is optional depending on the particular blockchain protocol used. Where required for a specific blockchain protocol exposed via the blockchain services interface 199, a block type 567 must be indicated as being one of an enumerated list of permissible block types 567 as described in greater detail below. Certain blockchain protocols use multiple different block types 567, all of which may have varying payloads, but have a structure which is known a priori according to the blockchain protocol used, the declared block type 567, and the blockchain protocol certification 566 certifying compliance with such requirements. Non-compliance or an invalid block type or an unexpected structure or payload for a given declared block type 567 will result in the rejection of that block by network nodes.

Where a variable sized block payload 569 is used, the block type 567 may indicate permissibility of such a variable sized block payload 569 as well as indicate the index of the first byte in the block payload 569 and the total size of the block payload 569. The block type 567 may be used to store other information relevant to the reading, accessing, and correct processing and interpretation of the block payload 569.

Block payload 569 data stored within the block may relate to any number of a wide array of transactional data depending on the particular implementation and blockchain protocol used, including payload information related to, for example, financial transactions, ownership information, data access records, document versioning, medical records, voting records, compliance and certification, educational transcripts, purchase receipts, digital rights management records, inventory data, or literally any kind of data that is storable via a payload of a blockchain protocol block 560, which is essentially any data capable of being digitized.

Depending on the particular blockchain protocol chosen, the payload size may be a fixed size or a variable size, which in either case, will be utilized as at least part of the input for the hash that produces the payload hash 563.

Various standard of proofs 565 may be used per the particular blockchain protocol chosen, such as proof of work, hash value requirements, proof of stake, a key, or some other indicator such as a consensus, or proof of consensus. Where consensus-based techniques are used, the blockchain consensus manager 591 provides consensus management on behalf of the host organization 510, however, the host organization 510 may be operating only as one of many nodes for a given blockchain protocol which is accessed by the host organization 510 via the blockchain services interface 199 or alternatively, the host organization 510 may define and provide a particular blockchain protocol as a cloud based service to customers and subscribers (and potentially to non-authenticated public node participants), via the blockchain services interface 199. Such a standard of proof 565 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 561, the payload hash 563, or the authorized hashes 568 may be all of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

FIG. 5B depicts another exemplary blockchain architecture, according to some implementations. In this example architecture, the blockchain consensus manager 591 and the permissions manager 581 operate to support consensus on read and access control processes as further described.

Host organization 510 includes the hosted computing environment 511 having processors and memory (e.g., within the execution hardware and software 520 of the database system 530), which serve to operate the blockchain services interface 199 including the blockchain consensus manager 591 and the blockchain metadata definition manager 596 which utilizes an index 518 by which to identify an addressable block of the blockchain 599 via which a desired object is stored. FIG. 5B also shows exemplary stored object(s) 590 at the second to last block of the blockchain 599.

Blockchain 599 begins with a root block 541 (sometimes called a genesis block) followed by a series of standard blocks 542, each having a header which is formed based at least in part from a hash of the header of the block which precedes it. In one implementation, one or more of standard blocks 542 corresponds to a blockchain protocol block 560 as shown in FIG. 5A. Because each block in the blockchain 599 contains a hash 549 of the immediately preceding block stored in the previous hash 549, a link going back through the chain from each block is effectively created via the blockchain 599 and makes maliciously modifying blockchain 599 prohibitively difficult or computationally infeasible.

Here, the stored object 590 stores a metric value 193 including first tenant ID 197, second tenant ID 198, metric ID 194, value 195, and timestamp 196, as shown in FIG. 1A.

Once the stored object(s) 590 is added to (also referred to as transacted onto) the blockchain, for instance, by adding an asset to the blockchain within which the stored object(s) 590 is embodied, data is persistently stored by the blockchain and accessible to participating nodes with access to the blockchain 599, however, when such data is retrieved, the stored object does not in of itself describe how to use such data, any particular format for such data, or how to validate such data. Therefore, the blockchain may store metadata which may then be used to define the format, validation means, and use for such data. Storage of metadata may exacerbate the problem of searching for and retrieving data from the blockchain however, because the blockchain 599 stores stored object(s) 590 and also stored metadata 594 associated with that object. An organization methodology is thus provided by the indexing scheme as implemented by the blockchain metadata definition manager 596 in conjunction with use of the index 518 which provides for more efficient storage, retrieval, and validation of data stored on the blockchain.

According to one implementation, stored object(s) 590 is therefore converted to a more efficient format for storage within the blockchain. Consider stored object(s) 590 for which a value 195 is stored. Subsequently, the object is updated to include a different value of value 195 and thus, either stored object(s) 590 is updated and re-written to the blockchain 599 in its entirety (thus creating a second copy, albeit updated, of stored object(s) 590) or alternatively, only the new portion, the updated value 195 is written to the blockchain 599 with a reference back to the prior object (in which case total storage volume is reduced, but retrieval of the entire object requires searching for and finding multiple blocks on the blockchain 599 from which to reconstruct the entire stored object(s) 590).

Example Electronic Devices and Environments

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices (also referred to as devices) are designed for and/or used for a variety of purposes, and different terms may reflect those purposes (e.g., user devices, network devices). Some user devices are designed to mainly be operated as servers (sometime referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, etc.). The software executed to operate a user device (typically a server device) as a server may be referred to as server software or server code), while the software executed to operate a user device (typically a client device) as a client may be referred to as client software or client code. A server provides one or more services to (also referred to as serves) one or more clients.

The term "user" refers to an entity (e.g., an individual person) that uses an electronic device, and software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
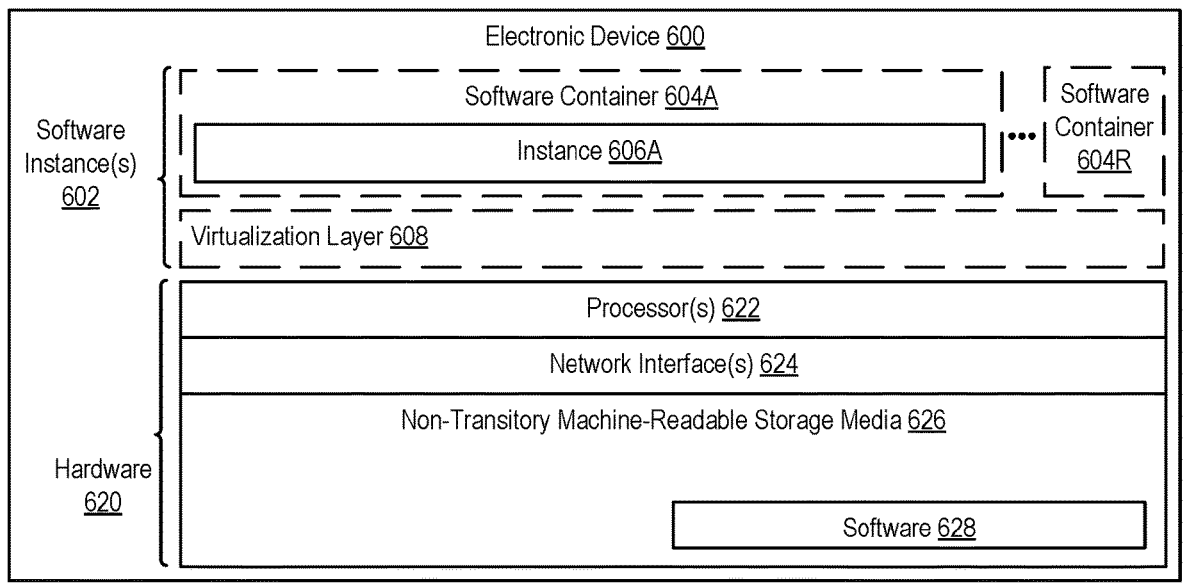
FIG. 6A is a block diagram illustrating an electronic device according to some implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and non-transitory machine-readable storage media 626 having stored therein software 628 (which includes instructions executable by the set of one or more processor(s) 622). One or more implementations described herein may be implemented as a service (e.g., a blockchain storage service). Each of the previously described payment processing engine 100, database 130, metadata repository 163, application server 180, application server 265, source of events 270, application server 277, code 375, database 430, application server 575, and so forth, may be implemented in one or more electronic devices 600. In one implementation, application server 180, metadata repository 163, and blockchain services interface 199 are part of a blockchain storage platform that offers a blockchain storage service. In other implementations, the blockchain storage platform includes one or more of the aforementioned payment processing engine, application server(s), database(s), code, etc., and the complement of those components are implemented as separate services to the blockchain storage platform. In one implementation, the blockchain storage platform is available to one or more clients (e.g., payment processing engine 100, a CRM system, etc.). In one implementation: 1) each of the clients is implemented in a separate one of the electronic devices 600 (e.g., in end user devices where the software 628 represents the software to implement clients to interface directly and/or indirectly with the blockchain storage service (e.g., software 628 represents a web browser, a native client, a portal, a command-line interface, and/or an application programming interface (API) based upon protocols such as Simple Object Access Protocol (SOAP), Representational State Transfer (REST), etc.)); 2) the blockchain storage service is implemented in a separate set of one or more of the electronic devices 600 (e.g., a set of one or more server devices where the software 628 represents the software to implement the blockchain storage service); and 3) in operation, the electronic devices implementing the clients and the blockchain storage service would be communicatively coupled (e.g., by a network) and would establish between them (or through one or more other layers and/or or other services) connections for invoking the blockchain storage service (which may include submitting data relating to payments to the blockchain storage service). Other configurations of electronic devices may be used in other implementations (e.g., an implementation in which the client and the blockchain storage service are implemented on a single electronic device 600).

During operation an instance of the software 628 (illustrated as instance 606A and also referred to as a software instance; and in the more specific case of an application, as an application instance) is executed. In electronic devices that use compute virtualization, the set of one or more processor(s) 622 typically execute software to instantiate a virtualization layer 608 and software container(s) 604A-R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation an instance of the software 628 is executed within the software container 604A on the virtualization layer 608. In electronic devices where compute virtualization is not used, the instance 606A on top of a host operating system is executed on the "bare metal" electronic device 600. The instantiation of the instance 606A, as well as the virtualization layer 608 and software containers 604A-R if implemented, are collectively referred to as software instance(s) 602.

Alternative implementations of an electronic device may have numerous variations from that described above. For example, customized hardware and/or accelerators might also be used in an electronic device.

Example Environment

Figure 6B:
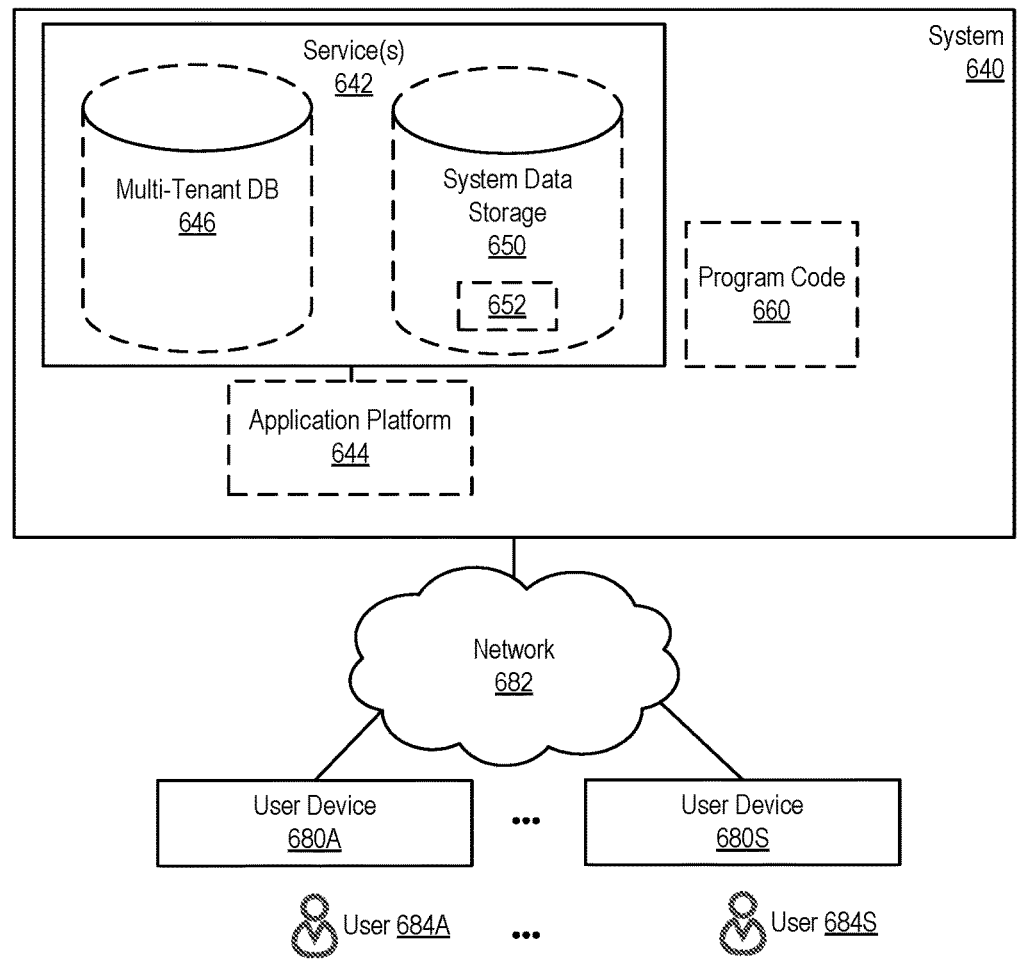
FIG. 6B is a block diagram of a deployment environment according to some implementations.

FIG. 6B is a block diagram of a deployment environment according to some example implementations. A system 640 includes hardware (e.g., a set of one or more server devices) and software to provide service(s) 642, including the blockchain storage service. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third party datacenter(s), which are datacenter(s) owned and/or operated by one or more different entities than the entity that provides the service(s) 642 (e.g., the different entities may host some or all of the software provided and/or operated by the entity that provides the service(s) 642). For example, third party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680A-S over a network 682. The service(s) 642 may be on-demand services that are made available to one or more of the users 684A-S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-S). The service(s) 642 may communicate with each other and/or with one or more of the user devices 680A-S via one or more APIs (e.g., a REST API). The user devices 680A-S are operated by users 684A-S.

In some implementations the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 640 is a multi-tenant cloud computing architecture supporting multiple services, such as one or more of the following:

| Type of Service | Example Service(s) by salesforce.com, inc. |
| --- | --- |
| Customer relationship management (CRM) | Sales Cloud, blockchain storage service |
| Configure, price, quote (CPQ) | CPQ and Billing |
| Business process modeling (BPM) | Process Builder |
| Customer support | Service Cloud, Field Service Lightning |
| Marketing | Commerce Cloud Digital, Commerce Cloud Order Management, Commerce Cloud Store |
| External data connectivity | Salesforce Connect |
| Productivity | Quip |
| Database-as-a-Service | Database.com ™ |
| Data-as-a-Service (DAAS or DaaS) | Data.com |
| Platform-as-a-service (PAAS or PaaS) | Heroku ™ Enterprise, Thunder, Force.com ®, Lightning |
| Infrastructure-as-a-Service (IAAS or IaaS) (e.g., virtual machines, servers, and/or storage) | |
| Analytics | Einstein Analytics, Sales Analytics, Service Analytics |
| Community | Community Cloud, Chatter |
| Internet-of-Things (IoT) | Salesforce IoT, IoT Cloud |
| Industry-specific | Financial Services Cloud, Health Cloud |
| Artificial intelligence (AI) | Einstein |
| Application marketplace ("app store") | AppExchange, AppExchange Store Builder |
| Data modeling | Schema Builder |
| Security | Salesforce Shield |
| Identity and access management (IAM) | Field Audit Trail, Platform Encryption, IT Governance, Access Management, Salesforce Identity, Salesforce Authenticator |

For example, system 640 may include an application platform 644 that enables PAAS for creating, managing, and executing one or more applications developed by the provider of the application platform 644, users accessing the system 640 via one or more of user electronic devices 680A-S, or third-party application developers accessing the system 640 via one or more of user electronic devices 680A-S.

In some implementations, one or more of the service(s) 642 may use one or more multi-tenant databases 646, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user electronic device 680A-S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the one or more multi-tenant database 646 and/or system data storage 650.

In some implementations, the service(s) 642 are implemented using virtual applications dynamically created at run time responsive to queries from the user electronic devices 680A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the blockchain storage service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user electronic devices 680A-S.

Each user electronic device 680A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a GUI provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow a user 684 to interact with various GUI pages that may be presented to a user 684. User electronic devices 680A-S might communicate with system 640 using TCP/IP (Transfer Control Protocol and Internet Protocol) and, at a higher network level, use other networking protocols to communicate, such as Hypertext Transfer Protocol (HTTP), Andrew File System (AFS), Wireless Application Protocol (WAP), File Transfer Protocol (FTP), Network File System (NFS), an application program interface (API) based upon protocols such as Simple Object Access Protocol (SOAP), REST, etc. In an example where HTTP is used, one or more user electronic devices 680A-S might include an HTTP client, commonly referred to as a "browser," for sending and receiving HTTP messages to and from server(s) of system 640, thus allowing users 684 of the user electronic device 680A-S to access, process and view information, pages and applications available to it from system 640 over network 682.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method comprising:
    retrieving, from a database, a first set of permissions that identify a first set of metrics, wherein the first set of permissions are stored by a first tenant of a multi-tenant system to grant permission to the multi-tenant system to store the first set of metrics for a second tenant of the multi-tenant system;
    selecting a metric from the first set of metrics based on a determination that a value of the metric is to be updated responsive to a payment in a transaction between the first tenant and the second tenant where the payment has been successfully processed;
    determining the value of the metric for the second tenant based on data relating to the payment; and
    storing, in a blockchain, the value of the metric with an identifier that uniquely identifies the second tenant in the blockchain.

2. The method of claim 1, the method further comprising:
    verifying that the second tenant granted the permission for the first set of metrics to be stored for the second tenant.

3. The method of claim 2, wherein the database is reserved to the first tenant, and wherein the verifying includes:
    retrieving, from a database that is reserved to the second tenant, a second set of permissions that identify a second set of metrics for which the second tenant granted permission to be stored for the second tenant, and
    determining that the second set of metrics includes the first set of metrics.

4. The method of claim 1, wherein a response from a payment gateway that processed the payment indicates that the payment has been successfully processed.

5. The method of claim 1, wherein a record in the database stores an indication that the payment has been successfully processed and the data relating to the payment.

6. The method of claim 5, wherein the method further comprises:
    retrieving, from an event published to a source of events, an indication that the payment has been successfully processed, wherein the event was published to the source of events responsive to inserting or updating the record.

7. The method of claim 1, wherein the determination that the value of the metric is to be updated is based on an attribute of an object that represents the metric, wherein the attribute indicates that the metric is to be updated based on successful processing of payments.

8. The method of claim 1, wherein the metric represents current balance owed, and wherein the determining the value of the metric for the second tenant is further based on a value of a current balance that the second tenant owes the first tenant and that is stored in the database.

9. The method of claim 1, wherein the metric represents number of payments that are currently overdue, wherein the payment was overdue, and wherein the determining the value of the metric is further based on a last value of the metric that is stored, in the blockchain, for the second tenant.

10. The method of claim 1, further comprising:
selecting another metric from the first set of metrics based on another determination that a value of the another metric is to be updated responsive to another payment between the first tenant and the second tenant where the another payment has been unsuccessfully processed;
determining the value of the another metric for the second tenant based on data relating to the another payment; and
storing, in the blockchain, the value of the another metric with the identifier that uniquely identifies the second tenant in the blockchain.

11. A non-transitory machine-readable storage medium that stores instructions that, when executed by a processor, are capable of causing the processor to perform operations comprising:
retrieving, from a database, a first set of permissions that identify a first set of metrics, wherein the first set of permissions are stored by a first tenant of a multi-tenant system to grant permission to the multi-tenant system to store the first set of metrics for a second tenant of the multi-tenant system;
selecting a metric from the first set of metrics based on a determination that a value of the metric is to be updated responsive to a payment in a transaction between the first tenant and the second tenant where the payment has been successfully processed;
determining the value of the metric for the second tenant based on data relating to the payment; and
storing, in a blockchain, the value of the metric with an identifier that uniquely identifies the second tenant in the blockchain.

12. The non-transitory machine-readable storage medium of claim 11, wherein the non-transitory machine-readable storage medium further provides instructions that, when executed by the processor, are capable of causing the processor to perform further operations comprising:
verifying that the second tenant granted the permission for the first set of metrics to be stored for the second tenant.

13. The non-transitory machine-readable storage medium of claim 12, wherein the database is reserved to the first tenant, and wherein the verifying includes:
retrieving, from a database that is reserved to the second tenant, a second set of permissions that identify a second set of metrics for which the second tenant granted permission to be stored for the second tenant, and
determining that the second set of metrics includes the first set of metrics.

14. The non-transitory machine-readable storage medium of claim 11, wherein a response from a payment gateway that processed the payment indicates that the payment has been successfully processed.

15. The non-transitory machine-readable storage medium of claim 11, wherein a record in the database stores an indication that the payment has been successfully processed and the data relating to the payment.

16. The non-transitory machine-readable storage medium of claim 11, wherein the determination that the value of the metric is to be updated is based on an attribute of an object that represents the metric, wherein the attribute indicates that the metric is to be updated based on successful processing of payments.

17. The non-transitory machine-readable storage medium of claim 11, wherein the metric represents number of payments that are currently overdue, wherein the payment was overdue, and wherein the determining the value of the metric is further based on a last value of the metric that is stored, in the blockchain, for the second tenant.

18. A system, comprising:
a non-transitory machine-readable storage medium that stores a blockchain storage service; and
a processor coupled to the non-transitory machine-readable storage medium, the processor to execute the blockchain storage service, the blockchain storage service to: retrieve, from a database, a first set of permissions that identify a first set of metrics, wherein the first set of permissions are stored by a first tenant of a multi-tenant system to grant permission to the multi-tenant system to store the first set of metrics for a second tenant of the multi-tenant system, to select a metric from the first set of metrics based on a determination that a value of the metric is to be updated responsive to a payment in a transaction between the first tenant and the second tenant where the payment has been successfully processed, to determine the value of the metric for the second tenant based on data relating to the payment, and to store, in a blockchain, the value of the metric with an identifier that uniquely identifies the second tenant in the blockchain.

19. The system of claim 18, wherein the blockchain storage service is further to verify that the second tenant granted the permission for the first set of metrics to be stored for the second tenant.

20. The system of claim 18, wherein a response from a payment gateway that processed the payment indicates that the payment has been successfully processed.

* * * * *